United States Patent
Xue et al.

(10) Patent No.: US 12,041,657 B2
(45) Date of Patent: Jul. 16, 2024

(54) SIDELINK MODE-1 BASED STANDALONE OPERATIONS

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/665,270

(22) Filed: Feb. 4, 2022

(65) Prior Publication Data

US 2023/0254895 A1    Aug. 10, 2023

(51) Int. Cl.
| | |
|---|---|
| *H04W 4/00* | (2018.01) |
| *H04W 72/0446* | (2023.01) |
| *H04W 74/00* | (2009.01) |
| *H04W 74/08* | (2009.01) |
| *H04W 74/0816* | (2024.01) |

(52) U.S. Cl.
CPC ... *H04W 74/0816* (2013.01); *H04W 72/0446* (2013.01); *H04W 74/006* (2013.01); *H04W 74/0866* (2013.01)

(58) Field of Classification Search
CPC ......... H04W 74/0816; H04W 72/0446; H04W 74/006; H04W 74/0866; H04W 72/232; H04W 72/40; H04W 74/0808; H04L 5/0055; H04L 5/0053; H04L 5/0098

See application file for complete search history.

(56) References Cited

U.S. PATENT DOCUMENTS

| | | | |
|---|---|---|---|
| 11,711,849 B2 * | 7/2023 | Xue | H04W 74/0816 370/329 |
| 2021/0368542 A1* | 11/2021 | Xue | H04W 72/23 |
| 2021/0400704 A1* | 12/2021 | Xue | H04L 1/1854 |
| 2023/0319878 A1* | 10/2023 | Hui | H04L 1/1854 370/329 |

FOREIGN PATENT DOCUMENTS

| | | | | |
|---|---|---|---|---|
| WO | WO-2022251863 A1 * | 12/2022 | | H04L 1/1854 |
| WO | WO-2023152619 A1 * | 8/2023 | | |
| WO | WO-2023167770 A1 * | 9/2023 | | H04W 72/1263 |
| WO | WO-2023183670 A1 * | 9/2023 | | H04L 1/08 |

* cited by examiner

*Primary Examiner* — Thai D Hoang

(74) *Attorney, Agent, or Firm* — Holland & Hart LLP /Qualcomm Incorporated

(57) ABSTRACT

Methods, systems, and devices for wireless communications are described. A user equipment (UE) may receive a first downlink control information (DCI) message indicating a first listen-before-talk (LBT) grant for accessing a sidelink channel, the first DCI being associated with a first search space of the UE. The UE may then receive a second DCI message indicating a second LBT grant for accessing the channel or an uplink channel, the second DCI being associated with a second search space of the UE and including an activation trigger for the first LBT grant of the first DCI. The UE may then perform a first LBT procedure to access the sidelink channel in accordance with the first LBT grant during a first channel occupancy time (COT). The UE may further perform a second LBT procedure to access the uplink channel during the first COT.

30 Claims, 23 Drawing Sheets

800-a 800-b

SIDELINK MODE-1 BASED STANDALONE OPERATIONS

FIELD OF TECHNOLOGY

The following relates to wireless communications, including sidelink mode-1 based standalone operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support Mode-1 sidelink deployments in which a UE is directly configured for sidelink signaling via the network.

SUMMARY

The described techniques relate to improved methods, systems, devices, and apparatuses that support sidelink mode-1 based standalone operations. Generally, the described techniques provide support for signaling in an unlicensed band, where a device such as a user equipment (UE) may operate using a mode-1 sidelink deployment. In such implementations, the UE may be within cellular coverage of a scheduling network device, and uses information received from the network to communicate via a sidelink channel. When operating in a Mode-1 standalone deployment, the UE may use listen-before-talk (LBT) procedures to gain access to the sidelink channel in an unlicensed band using an LBT grant received in downlink control information (DCI). Using the LBT grant, the UE may then gain access to a channel occupancy time (COT) for transmission of sidelink information. Such Mode-1 unlicensed operation may enhance sidelink scheduling and reduce channel collisions by more effectively coordinating coexistence with other radio access technologies (RATs) on the unlicensed band via LBT. Additionally or alternatively, wireless communications system may support sidelink, uplink, and downlink resource allocation for UE in the same LBT sub-band and may further support COT sharing between devices.

In some examples described herein, the UE may receive a resource pool that has both downlink and uplink (DL/UL) and sidelink (SL) resources time division multiplexed (TDM) in a single LBT sub-band. In such examples, the UE may be configured with two search space sets to receive two DCIs for configuring an LBT grant for Type 2 LBT-based sidelink channel accesses. Additionally or alternatively, the UE may be granted (via the received DCI) to perform uplink transmissions, sidelink transmissions, or both, using a COT shared directly with the network device.

A method for wireless communication at a UE operating in an unlicensed band is described. The method may include receiving, from a network entity, first DCI associated with a first search space of the UE, the first DCI indicating a LBT grant for accessing a sidelink channel, receiving, from the network entity, second DCI associated with a second search space of the UE, the second DCI including an activation trigger for the LBT grant of the first DCI, and performing a LBT procedure to access the sidelink channel in accordance with the LBT grant indicated by the first DCI and the second DCI.

An apparatus for wireless communication at a UE operating in an unlicensed band is described. The apparatus may include a processor, memory coupled with the processor, and instructions stored in the memory. The instructions may be executable by the processor to cause the apparatus to receive, from a network entity, first DCI associated with a first search space of the UE, the first DCI indicating a LBT grant for accessing a sidelink channel, receive, from the network entity, second DCI associated with a second search space of the UE, the second DCI including an activation trigger for the LBT grant of the first DCI, and perform a LBT procedure to access the sidelink channel in accordance with the LBT grant indicated by the first DCI and the second DCI.

Another apparatus for wireless communication at a UE operating in an unlicensed band is described. The apparatus may include means for receiving, from a network entity, first DCI associated with a first search space of the UE, the first DCI indicating a LBT grant for accessing a sidelink channel, means for receiving, from the network entity, second DCI associated with a second search space of the UE, the second DCI including an activation trigger for the LBT grant of the first DCI, and means for performing a LBT procedure to access the sidelink channel in accordance with the LBT grant indicated by the first DCI and the second DCI.

A non-transitory computer-readable medium storing code for wireless communication at a UE operating in an unlicensed band is described. The code may include instructions executable by a processor to receive, from a network entity, first DCI associated with a first search space of the UE, the first DCI indicating a LBT grant for accessing a sidelink channel, receive, from the network entity, second DCI associated with a second search space of the UE, the second DCI including an activation trigger for the LBT grant of the first DCI, and perform a LBT procedure to access the sidelink channel in accordance with the LBT grant indicated by the first DCI and the second DCI.

Some examples of the method, apparatuses, and non-transitory computer-readable medium described herein may further include operations, features, means, or instructions for performing the LBT procedure to access the sidelink channel based on the second DCI triggering the first DCI.

In some examples of the method, apparatuses, and non-transitory computer-readable medium described herein, the first DCI includes an extended DCI and the method, apparatuses, and non-transitory computer-readable medium may include further operations, features, means, or instructions for receiving, from the network entity, the extended DCI indicating the LBT grant, where the LBT grant indicates a subset of sidelink shared channel transmissions, a subset of sidelink control channel transmissions, or both, based on the LBT procedure.

Some examples of the method, apparatuses, and non-transitory computer-readable medium described herein may further include operations, features, means, or instructions for determining, based on the extended DCI, a set of sidelink feedback channel resources for transmitting hybrid automatic repeat request (HARQ) information corresponding to the subset of sidelink shared channel transmissions, the subset of sidelink control channel transmissions, or both and transmitting an indication of the set of sidelink feedback channel resources to at least a second UE.

In some examples of the method, apparatuses, and non-transitory computer-readable medium described herein, the first DCI includes an extended DCI indicating an LBT type for the LBT procedure and the method, apparatuses, and non-transitory computer-readable medium may include further operations, features, means, or instructions for performing a type-1 LBT procedure to access the sidelink channel based on the extended DCI.

In some examples of the method, apparatuses, and non-transitory computer-readable medium described herein, the first DCI includes an extended DCI indicating an LBT type for the LBT procedure and the second DCI includes a triggering DCI and the method, apparatuses, and non-transitory computer-readable medium may include further operations, features, means, or instructions for performing a type-2 LBT procedure to access the sidelink channel based on the extended DCI and the triggering DCI, where the triggering DCI indicates a shared COT for the UE and the network entity.

In some examples of the method, apparatuses, and non-transitory computer-readable medium described herein, the triggering DCI further indicates a corresponding set of sidelink feedback resources associated with the type-2 LBT.

In some examples of the method, apparatuses, and non-transitory computer-readable medium described herein, the triggering DCI includes a first DCI format to trigger the extended DCI or a second DCI format having a triggering field.

In some examples of the method, apparatuses, and non-transitory computer-readable medium described herein, the first DCI includes an extended DCI indicating switching between the first search space of the UE to the second search space of the UE.

In some examples of the method, apparatuses, and non-transitory computer-readable medium described herein, the extended DCI includes a one-bit trigger for the UE to switch between monitoring the first search space of the UE to the second search space of the UE.

In some examples of the method, apparatuses, and non-transitory computer-readable medium described herein, the extended DCI includes a set of multiple bits indicating a monitoring offset and a trigger for the UE to switch between monitoring the first search space of the UE to the second search space of the UE.

Some examples of the method, apparatuses, and non-transitory computer-readable medium described herein may further include operations, features, means, or instructions for receiving, from the network entity, an indication of an uplink resource for transmitting uplink control information to report whether the UE received one or more discontinuous transmissions from at least a second UE during a portion of the sidelink channel.

Some examples of the method, apparatuses, and non-transitory computer-readable medium described herein may further include operations, features, means, or instructions for transmitting, to the network entity, a negative acknowledgement (NACK) on the uplink resource as part of the uplink control information to indicate a contention window update based on the one or more discontinuous transmissions.

In some examples of the method, apparatuses, and non-transitory computer-readable medium described herein, the first search space and the second search space include slot-based search space sets, mini-slot-based search space sets, or a combination thereof.

In some examples of the method, apparatuses, and non-transitory computer-readable medium described herein, the LBT procedure includes a type-2 LBT procedure.

A method for wireless communications at a UE operating in an unlicensed band is described. The method may include receiving, from a network entity, first DCI associated with a first search space of the UE, the first DCI indicating a first LBT grant for accessing a sidelink channel during a first COT, receiving, from the network entity, second DCI associated with a second search space of the UE, the second DCI indicating a second LBT grant for accessing an uplink channel during the first COT, the second DCI being coupled with the first DCI, performing the first LBT procedure to access the sidelink channel during the first COT in accordance with the first LBT grant, and performing a second LBT procedure to access the uplink channel during the first COT in accordance with the second LBT grant.

An apparatus for wireless communications at a UE operating in an unlicensed band is described. The apparatus may include a processor, memory coupled with the processor, and instructions stored in the memory. The instructions may be executable by the processor to cause the apparatus to receive, from a network entity, first DCI associated with a first search space of the UE, the first DCI indicating a first LBT grant for accessing a sidelink channel during a first COT, receive, from the network entity, second DCI associated with a second search space of the UE, the second DCI indicating a second LBT grant for accessing an uplink channel during the first COT, the second DCI being coupled with the first DCI, perform the first LBT procedure to access the sidelink channel during the first COT in accordance with the first LBT grant, and perform a second LBT procedure to access the uplink channel during the first COT in accordance with the second LBT grant.

Another apparatus for wireless communications at a UE operating in an unlicensed band is described. The apparatus may include means for receiving, from a network entity, first DCI associated with a first search space of the UE, the first DCI indicating a first LBT grant for accessing a sidelink channel during a first COT, means for receiving, from the network entity, second DCI associated with a second search space of the UE, the second DCI indicating a second LBT grant for accessing an uplink channel during the first COT, the second DCI being coupled with the first DCI, means for performing the first LBT procedure to access the sidelink channel during the first COT in accordance with the first LBT grant, and means for performing a second LBT procedure to access the uplink channel during the first COT in accordance with the second LBT grant.

A non-transitory computer-readable medium storing code for wireless communications at a UE operating in an unlicensed band is described. The code may include instructions executable by a processor to receive, from a network entity, first DCI associated with a first search space of the UE, the first DCI indicating a first LBT grant for accessing a sidelink channel during a first COT, receive, from the network entity, second DCI associated with a second search space of the UE, the second DCI indicating a second LBT grant for accessing an uplink channel during the first COT, the second DCI being coupled with the first DCI, perform the first LBT procedure to access the sidelink channel during the first COT in accordance with the first LBT grant, and perform a second LBT procedure to access the uplink channel during the first COT in accordance with the second LBT grant.

In some examples of the method, apparatuses, and non-transitory computer-readable medium described herein, the first LBT includes a type-1 LBT and the second LBT includes a type-2 LBT.

Some examples of the method, apparatuses, and non-transitory computer-readable medium described herein may further include operations, features, means, or instructions for transmitting a first sidelink transmission during the first COT using a first transmission power and transmitting a first uplink transmission during the first COT using a second transmission power, the second transmission power being less than or equal to the first transmission power.

In some examples of the method, apparatuses, and non-transitory computer-readable medium described herein, the first DCI indicates that the first COT may be shared by the network entity.

Some examples of the method, apparatuses, and non-transitory computer-readable medium described herein may further include operations, features, means, or instructions for receiving, from the network entity, a first configured grant for transmitting sidelink communications during the first COT and coupling the first configured grant with a corresponding configured grant for uplink or a dynamic grant for uplink during the first COT.

Some examples of the method, apparatuses, and non-transitory computer-readable medium described herein may further include operations, features, means, or instructions for receiving, from the network entity, a second configured grant for transmitting uplink communications during the first COT and coupling the second configured grant with a corresponding configured grant for sidelink or a dynamic grant for sidelink during the first COT.

Some examples of the method, apparatuses, and non-transitory computer-readable medium described herein may further include operations, features, means, or instructions for receiving, from the network entity, third DCI indicating a coupling of a configured grant for uplink or sidelink communications to a dynamic grant for uplink or sidelink communications during the first COT.

A method for wireless communication at a network entity operating in an unlicensed band is described. The method may include transmitting first DCI associated with a first search space of a UE, the first DCI indicating a LBT grant for accessing a sidelink channel and transmitting second DCI associated with a second search space of the UE, the second DCI including an activation trigger for the LBT grant of the first DCI.

An apparatus for wireless communication at a network entity operating in an unlicensed band is described. The apparatus may include a processor, memory coupled with the processor, and instructions stored in the memory. The instructions may be executable by the processor to cause the apparatus to transmit first DCI associated with a first search space of a UE, the first DCI indicating a LBT grant for accessing a sidelink channel and transmit second DCI associated with a second search space of the UE, the second DCI including an activation trigger for the LBT grant of the first DCI.

Another apparatus for wireless communication at a network entity operating in an unlicensed band is described. The apparatus may include means for transmitting first DCI associated with a first search space of a UE, the first DCI indicating a LBT grant for accessing a sidelink channel and means for transmitting second DCI associated with a second search space of the UE, the second DCI including an activation trigger for the LBT grant of the first DCI.

A non-transitory computer-readable medium storing code for wireless communication at a network entity operating in an unlicensed band is described. The code may include instructions executable by a processor to transmit first DCI associated with a first search space of a UE, the first DCI indicating a LBT grant for accessing a sidelink channel and transmit second DCI associated with a second search space of the UE, the second DCI including an activation trigger for the LBT grant of the first DCI.

Some examples of the method, apparatuses, and non-transitory computer-readable medium described herein may further include operations, features, means, or instructions for transmitting the second DCI triggers activation of the first DCI.

In some examples of the method, apparatuses, and non-transitory computer-readable medium described herein, the first DCI includes an extended DCI and the method, apparatuses, and non-transitory computer-readable medium may include further operations, features, means, or instructions for transmitting the extended DCI indicating the LBT grant, where the LBT grant indicates a subset of sidelink shared channel transmissions, a subset of sidelink control channel transmissions, or both, based on the LBT procedure.

In some examples of the method, apparatuses, and non-transitory computer-readable medium described herein, the first DCI includes an extended DCI indicating switching between the first search space of the UE to the second search space of the UE.

Some examples of the method, apparatuses, and non-transitory computer-readable medium described herein may further include operations, features, means, or instructions for transmitting an indication of an uplink resource for transmitting uplink control information to report whether the UE received one or more discontinuous transmissions from at least a second UE during a portion of the sidelink channel.

Some examples of the method, apparatuses, and non-transitory computer-readable medium described herein may further include operations, features, means, or instructions for receiving a NACK on the uplink resource as part of the uplink control information to indicate a contention window update based on the one or more discontinuous transmissions and transmitting an update to the contention window in accordance with the received NACK.

A method for wireless communications at network entity operating in an unlicensed band is described. The method may include transmitting first DCI associated with a first search space of a UE, the first DCI indicating a first LBT grant for accessing a sidelink channel during a first COT and transmitting second DCI associated with a second search space of the UE, the second DCI indicating a second LBT grant for accessing an uplink channel during the first COT, the second DCI being coupled with the first DCI.

An apparatus for wireless communications at network entity operating in an unlicensed band is described. The apparatus may include a processor, memory coupled with the processor, and instructions stored in the memory. The instructions may be executable by the processor to cause the apparatus to transmit first DCI associated with a first search space of a UE, the first DCI indicating a first LBT grant for accessing a sidelink channel during a first COT and transmit second DCI associated with a second search space of the UE, the second DCI indicating a second LBT grant for accessing an uplink channel during the first COT, the second DCI being coupled with the first DCI.

Another apparatus for wireless communications at network entity operating in an unlicensed band is described. The apparatus may include means for transmitting first DCI associated with a first search space of a UE, the first DCI indicating a first LBT grant for accessing a sidelink channel during a first COT and means for transmitting second DCI associated with a second search space of the UE, the second DCI indicating a second LBT grant for accessing an uplink channel during the first COT, the second DCI being coupled with the first DCI.

A non-transitory computer-readable medium storing code for wireless communications at network entity operating in an unlicensed band is described. The code may include instructions executable by a processor to transmit first DCI associated with a first search space of a UE, the first DCI indicating a first LBT grant for accessing a sidelink channel during a first COT and transmit second DCI associated with a second search space of the UE, the second DCI indicating a second LBT grant for accessing an uplink channel during the first COT, the second DCI being coupled with the first DCI.

In some examples of the method, apparatuses, and non-transitory computer-readable medium described herein, the first DCI indicates that the first COT may be shared by the network entity.

DETAILED DESCRIPTION

Some wireless communications systems may support signaling in an unlicensed band, where a device such as a user equipment (UE) may operate using mode-1 sidelink, where the UE is within cellular coverage of a network device and receives resource allocation information directly from the network device for scheduling uplink and sidelink communications. For example, a UE may receive an indication of a sidelink resource pool which includes sidelink resources, and may receive a corresponding grant from a base station or other network entity for performing a listen-before-talk (LBT) procedure to gain access to the sidelink channel. Specifically, the UE may monitor a configured Uu search-space (SS) to receive one or more downlink control information (DCI) messages from the network entity, which may be used to dynamically grant sidelink resources.

When operating in a Mode-1 standalone deployment, the UE may use LBT procedures to gain access to a sidelink channel in an unlicensed band using an LBT grant received in DCI. Using the LBT, the UE may then gain access to a channel occupancy time (COT) for transmission of sidelink information. In some cases, however, such procedures are performed using mode-2 operations which are subject to reliability issues and intra radio access technology (intra-RAT) collisions, which increases LBT uncertainty. Thus, in some implementations, a wireless communications system may support Mode 1-based standalone operations on an unlicensed band for sidelink resource allocation and associated communications. Such Mode-1 unlicensed operation may enhance sidelink scheduling and reduce channel collisions by more effectively coordinating coexistence with other RATs on the unlicensed band via LBT. Additionally or alternatively, wireless communications system may support sidelink, uplink, and downlink resource allocation for UE 115-*a* in the same band and may further support COT sharing between devices.

In some implementations, when operating in Mode 1, the UE may receive a resource pool that has both downlink and uplink (DL/UL) and sidelink (SL) resources time-division multiplexed (TDM) in an LBT sub-band. In this example, the UE may be configured with two search space sets, and the UE may receive DCIs by monitoring the two search space sets. The received DCIs may include a grant for Type 2 LBT-based sidelink channel accesses for the UE. Additionally or alternatively, the UE may be granted (via the received DCI) to perform uplink transmissions, sidelink transmissions, or both, using a COT shared with the network entity.

Aspects of the disclosure are initially described in the context of wireless communications systems. Aspects of the disclosure are further illustrated by and described with reference to apparatus diagrams, system diagrams, resource pool configurations, a process flow, and flowcharts that relate to sidelink mode-1 based standalone operations.

Figure 1:
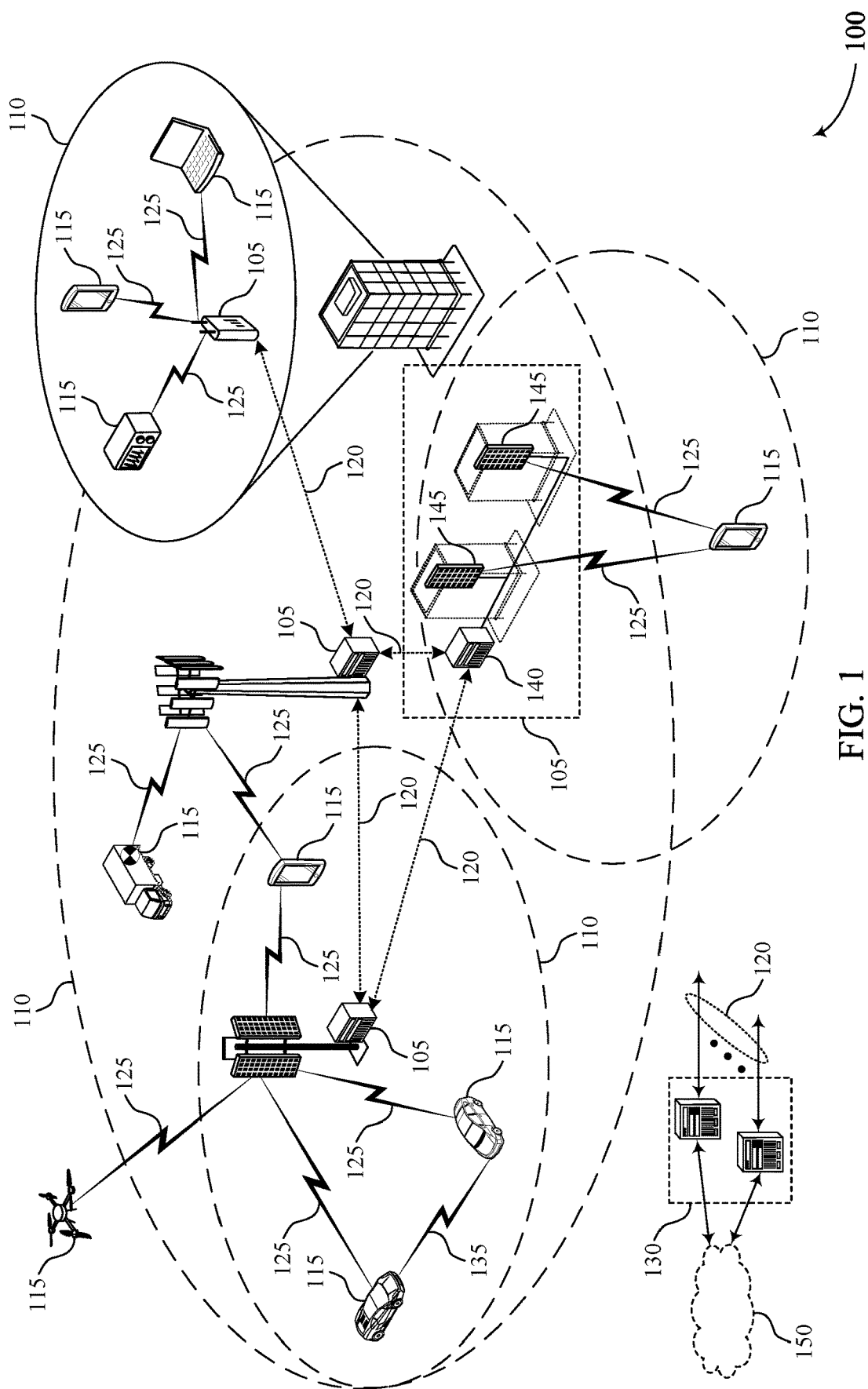
FIGS. 1 and 2 illustrate example wireless communications systems that support sidelink mode-1 based standalone operations in accordance with aspects of the present disclosure.

FIG. 1 illustrates an example of a wireless communications system 100 that supports sidelink mode-1 based standalone operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

As described herein, a base station 105 may include one or more components that are located at a single physical location or one or more components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated BS). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support signaling in an unlicensed band, where a device such as a UE 115 may operate using mode-1 sidelink, where the UE 115 is within cellular coverage of a base station 105 or another scheduling network device, and uses information received from the base station 105 to communicate via a sidelink with another UE 115. When operating in a Mode-1 standalone deployment, the UE may use LBT procedures to gain access to a sidelink channel in an unlicensed band using an LBT grant received in DCI. Using the LBT, the UE may then gain access to a COT for transmission of sidelink information. Such Mode-1 unlicensed operation may enhance sidelink scheduling and reduce channel collisions by more effectively coordinating coexistence with other RATs on the unlicensed band via LBT. Additionally or alternatively, wireless communications system may support sidelink, uplink, and downlink resource allocation for UE 115 in the same band and may further support COT sharing between devices.

In some implementations described herein, the UE 115 may receive a resource pool that has both downlink and uplink (DL/UL) and sidelink (SL) resources TDMed in an LBT sub-band. In such examples, the UE 115 may be configured with two search space sets to receive two DCIs for configuring an LBT grant for Type 2 LBT-based sidelink channel accesses. Additionally or alternatively, the UE 115 may be granted (via the received DCI) to perform uplink transmissions, sidelink transmissions, or both, using a COT shared with the base station 105.

Figure 2:
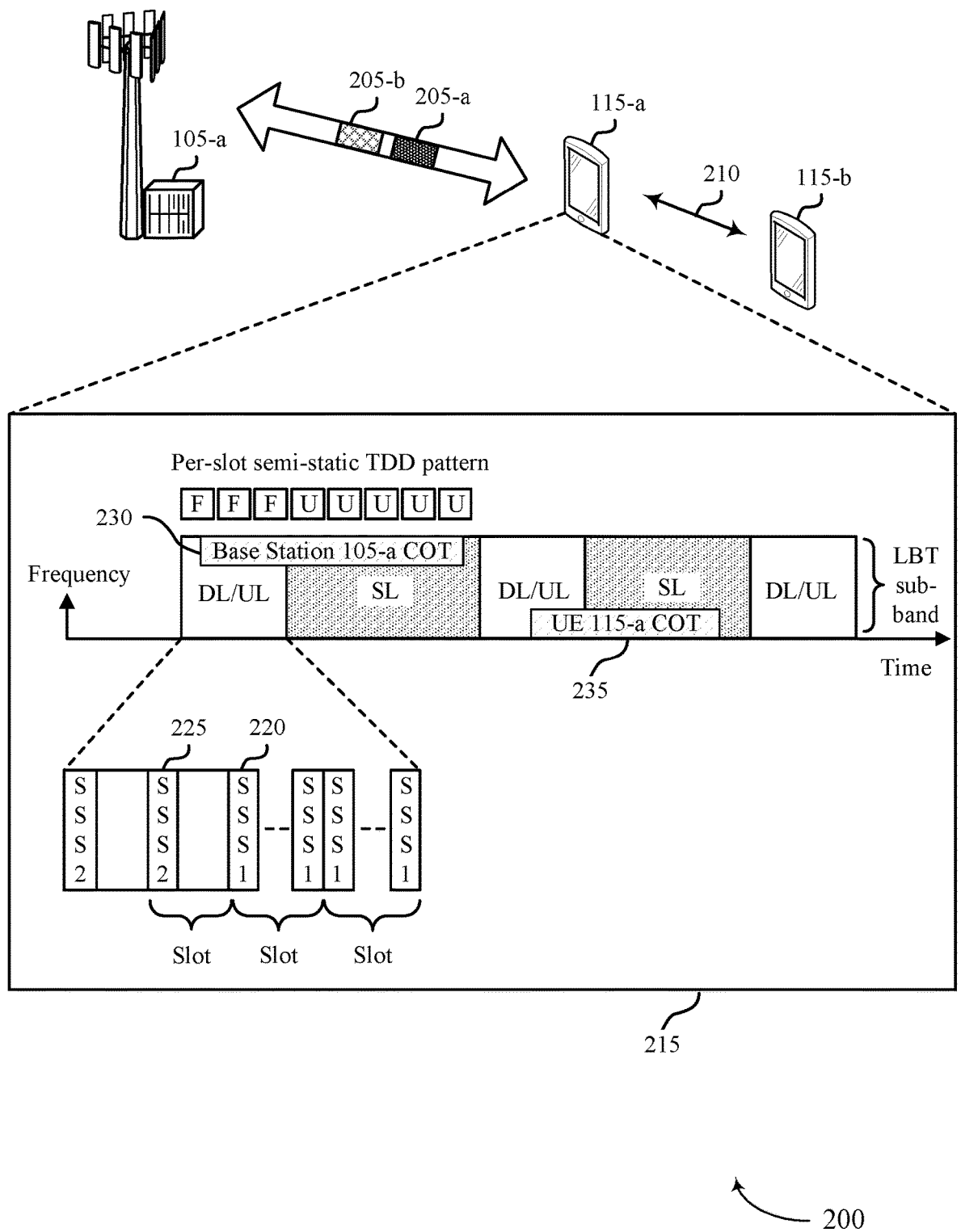

FIG. 2 illustrates an example of a wireless communications system 200 that supports sidelink mode-1 based standalone operations in accordance with aspects of the present disclosure. For example, wireless communications system 200 may support mode-1 based signaling between a base station 105-a and a UE 115-a, along with sidelink signaling between a UE 115-a and a UE 115-b, each of which may be examples of corresponding devices described with reference to FIG. 1.

Wireless communications system 200 may support communications in an unlicensed band, where a UE 115-a may operate using mode-1 sidelink (e.g., the UE 115-a is within cellular coverage and receives resource allocation information directly from a base station 105-a). For example, the UE 115-a may receive a sidelink resource pool 215 in a system information block (SIB) or via an RRC configuration for sidelink operations, and may receive a grant from the base station 105-a for channel access on orthogonal resources (or resources with controllable spatial reuse). Specifically, the UE 115-a may monitor a configured Uu search-space (SS) to receive one or more DCI (i.e., DCI 3-0) from the base station 105-a, which may be used to dynamically grant up to three sidelink resources for a transport block (TB) in addition to an assigned PUCCH resource to request sidelink resources for additional retransmissions of sidelink information.

Resource allocation in Mode-1 allows the UE 115-a to monitor a configured Uu search space to receive DCI 205 that can dynamically grant sidelink resources for the UE 115-a. In some cases, when operating in a Mode-1 standalone deployment, the UE 115-a may use LBT procedures to gain access to a sidelink channel in an unlicensed band using an LBT grant in the received DCI 205. Using the LBT, the UE 115-a may then gain access to a COT for transmission of sidelink information to the UE 115-b on a sidelink or PC5 link 210.

In some cases, however, such procedures are performed using mode-2 operations and inter-UE coordination have been limited to sub-6 GHz licensed bands or ITS bands, which are subject to reliability issues and intra-RAT collisions, which increases LBT uncertainty. These challenges are also increased by use of rate and reliability-demanding applications (>400 Mbps data rate and associated reliability) supported by sidelink deployments (e.g., XR), within the sub-6 GHz spectrum.

In some implementations, the wireless communications system 200 may support Mode 1-based standalone operations on an unlicensed band for sidelink resource allocation and associated communications. Such Mode-1 unlicensed operation may enhance sidelink scheduling and reduce channel collisions by more effectively coordinating coexistence with other RATs on the unlicensed band via LBT. Additionally or alternatively, wireless communications system 200 may support sidelink, uplink, and downlink resource allocation for UE 115-a in the same band and may further support COT sharing between devices.

In some implementations, when operating in Mode 1, the sidelink UE 115-a may receive a layer-3 (L3) configuration that has downlink and uplink (DL/UL) and sidelink (SL) resources time-division multiplexed (TDMed) in an LBT sub-band 215. In this example, the UE 115-a may be configured with two search space sets (e.g., SSS1 220 and SSS2 225) to receive one or more DCIs that grant Type 2 LBT-based SL channel accesses for the UE 115-a. In some examples, the UE 115-a may receive a "to-be-triggered" DCI 205-a (e.g., a DCI 3-0) in SS2 225, which depends on another DCI (e.g., an activation DCI 205-b) that the UE 115-a may receive in SSS1 220. In such cases, receiving both DCIs 205-a and 205-b from different search space sets (SS1 220 and SS2 225) may facilitate Type-2 LBT-based channel access for the UE 115-a. Additionally or alternatively, the UE 115-a may be granted (via DCI 205-a and DCI 205-b, which may be coupled DCI 0-1 and DCI 3-0) to perform uplink transmissions, sidelink transmissions, or both, in the same COT (e.g., COT 230 or COT 235). The UE 115-a may obtain the COT 230 or 235 via a mini-slot based type 1 LBT, or the COT may be shared by the base station 105-a. In some other examples, the UE 115-a may use an additional UCI for sidelink channel access to request a contention window (CW) update at the base station 105-a.

Figure 3A:
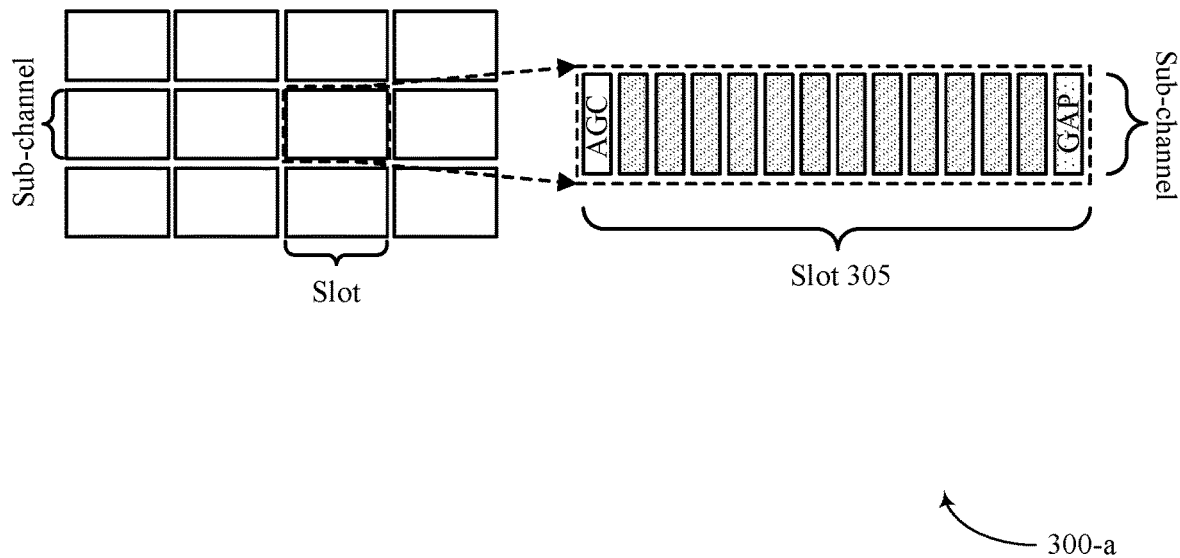
FIGS. 3A and 3B illustrate example resource pool configurations that support sidelink mode-1 based standalone operations in accordance with aspects of the present disclosure.
Figure 3B:
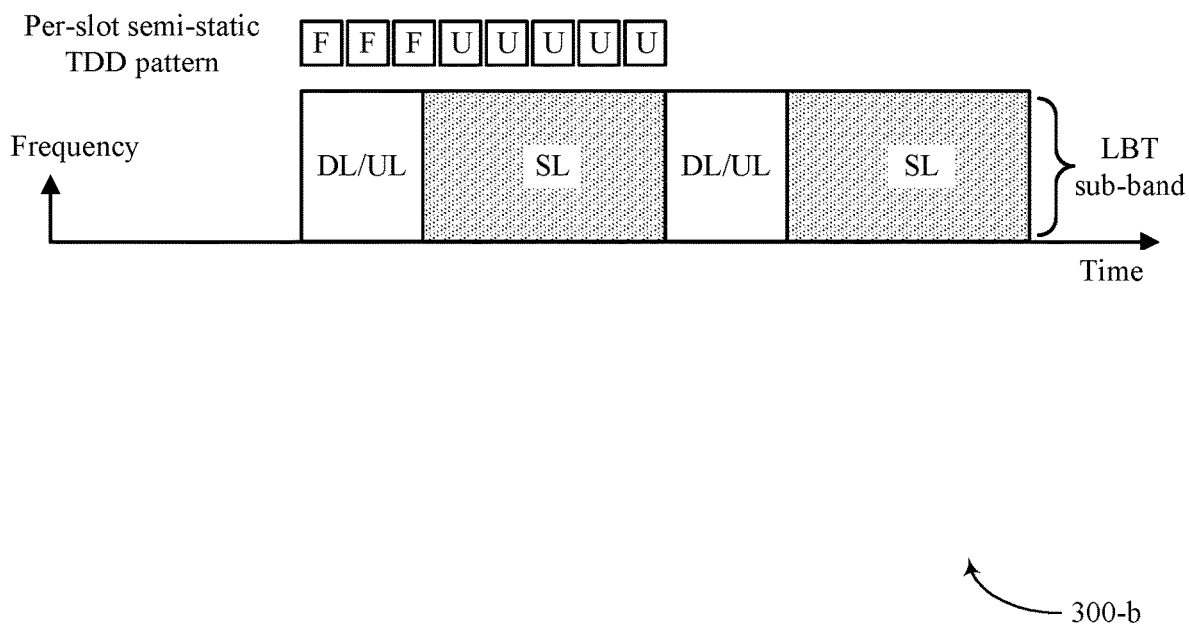

FIGS. 3A and 3B illustrate example resource pool configurations 300-a and 300-b that support sidelink mode-1 based standalone operations in accordance with aspects of the present disclosure. For example, resource pool configurations 300-a and 300-b may support communications between wireless devices described with reference to FIGS. 1 and 2. Resource pool configurations 300-a and 300-b may support communications between UEs and base stations, or between other devices described herein.

FIG. 3A depicts an example of a sidelink resource allocation and access scheme 300-a including a number of sub-channels and slots of a sidelink channel. In some examples, some wireless communications systems (e.g., 5G/NR wireless systems) may be synchronous systems such that sidelink devices may access a channel at a boundary of the slot 305. At slot 305, the first OFDM symbol may be used for automatic gain control (AGC) and the last OFDM symbol may be used as a gap symbol (e.g., to facilitate TX-RX switching). This slot structure may enable simultaneous many-to-many message exchanging in an OFDMA framework.

In some cases, however, mode-2 type operations for sidelink may reduce reliability and may be disadvantageous for wireless devices that compete for channel access in an unlicensed band requiring LBT. For example, a wireless node such as a WiFi node may access the channel 300-a at any time with a floating LBT, which may block near-by sidelink UEs within the maximum channel occupancy time (MCOT) of the WiFi node. Thus, to fairly co-exist with WiFi, the channel 300-a may support mini-slot based channel access was specified with the finest granularity being two OFDM symbols. In some examples, devices may be able to share COTs in a slot-based sidelink or PC5 channel using similar techniques as in COT sharing for mini-slot based Uu operations. For example, a UE may obtain the COT using a mini-slot based type 1 LBT, or the COT may be shared by the base station in a mode-1 sidelink deployment.

FIG. 3B depicts an example configuration for COT sharing 300-b between wireless devices within an LBT sub-band. In the example of the resource pool 300-b, COT sharing may be supported within an LBT sub-band (e.g., ≈20 MHz in 5G/6 GHz unlicensed band). After obtaining a COT with Type 1 LBT, a first node (e.g., a base station) can share its COT with a second node (e.g., a UE) via arranging small enough gap(s) in the COT that the second node can use to skip a CCA check and immediately transmit data. For example, if the gap is smaller than 16 µs, the second node can directly transmit at the time indicated by the first node during the shared COT. Additionally or alternatively, the first node may access the COT by performing a 16 µs/25 µs one-shot CCA if the gap is not larger than 25 µs.

To leverage COT sharing, the sidelink resource pool may be TDMed with DL/UL resources in the LBT sub-band. The sidelink resource pool may be specified over cell-wide (e.g., semi-static) "U" slots. In addition, the sidelink resource pool may include a number of flexible "F" slots for TDD. In such examples, a device such as a base station or a UE may compete with a WiFi node during "F" slots using a mini-slot, and share or use the same COT for slot-based SL transmissions. In some examples, the UE may be granted to perform both uplink transmissions and sidelink transmissions in a same COT via one or more DCI, or via coupled DCI received from the base station.

Figure 4A:
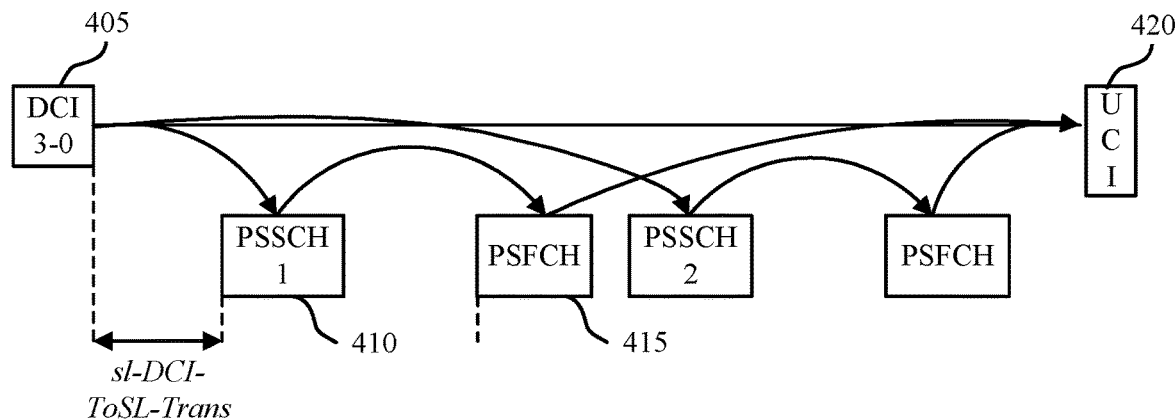
FIGS. 4A and 4B illustrates example sidelink scheduling configurations that support sidelink mode-1 based standalone operations in accordance with aspects of the present disclosure.
Figure 4B:
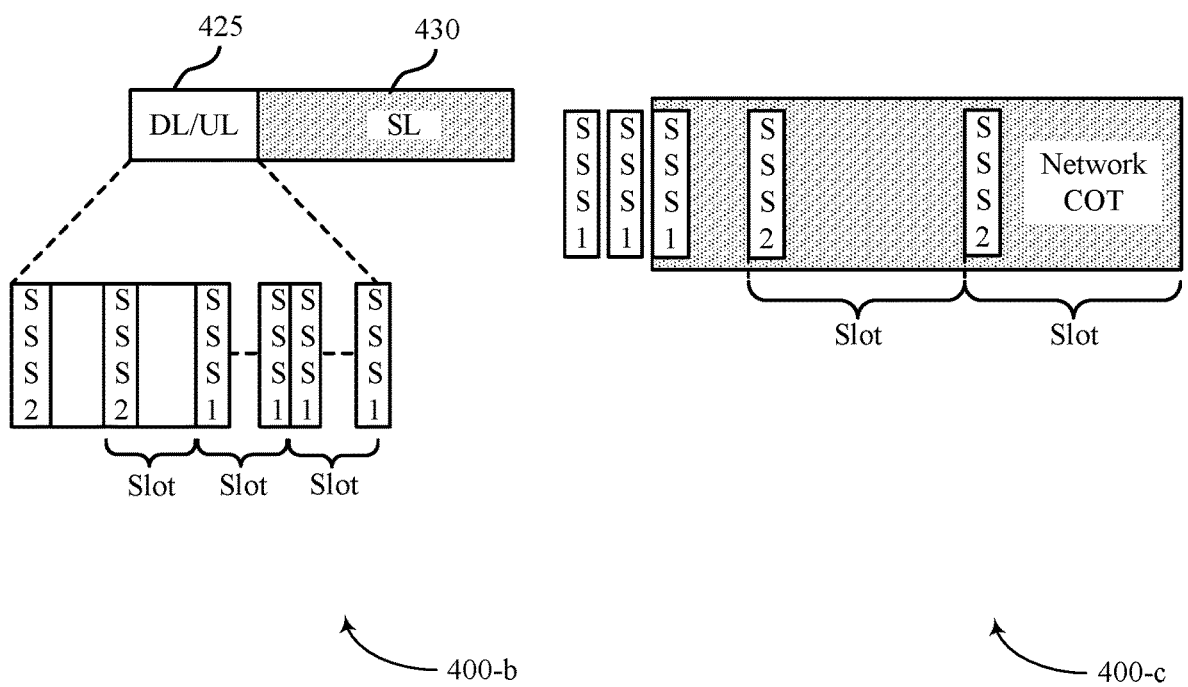

FIGS. 4A and 4B illustrate example sidelink scheduling configurations 400-a and 400-b that support sidelink mode-1 based standalone operations in accordance with aspects of the present disclosure. For example, sidelink scheduling configurations 400-a and 400-b may support communications between wireless devices described with reference to FIGS. 1 and 2. Sidelink scheduling configurations 400-a and 400-b may support communications between UEs and base stations, or between other devices described herein.

FIG. 4A shows a DCI configuration for COT sharing 400-a. In some cases a DCI 405 (e.g., DCI 3-0) may be used for indicating or granting operations for COT sharing from Uu to PC5. The DCI 405 may indicate that the soonest sidelink resource is a number of slots (e.g., indicated by sl-DCI-ToSL-Trans-r16) away from the slot in which the UE receives the DCI 405. The number of slots may be selected from one of eight candidate slot numbers (e.g., with slot numbers ranging between 1 and 32 slots).

In a first example a base station may initiate "direct" COT sharing, in which the base station obtains a COT, sends a DCI 405 (e.g., DCI 3-0) to the UE with an indicated duration (e.g., sl-DCI-ToSL-Trans-r16) between the DCI 405 and a sidelink transmission (e.g., PSSCH 410) taking a value smaller than a maximum COT. Based on transmitting the DCI 405, the UE may keep the channel until the start of the scheduled sidelink transmission (e.g., a sidelink transmission scheduled with Type 2 LBT, such as PSSCH 410).

In a second example, a base station may initiate "indirect" COT sharing, in which a base station sends the DCI 405 (e.g., DCI 3-0) with an indicated duration (e.g., sl-DCI-ToSL-Trans-r16) between the DCI 405 and a sidelink transmission (e.g., PSSCH 410) taking a value larger than a maximum COT. Additionally or alternatively, the DCI 405 may indicate an opportunity for the UE to use a Type 2 LBT procedure to gain channel access for transmitting sidelink communications. In such cases, the opportunity may be a COT-sharing indication from the base station for the UE to share a COT with the base station in the future, or COT-sharing indication for the UE to share a COT with the base station for transmitting uplink communications preceding the scheduled sidelink communications.

The DCI 405 may further include additional scheduling for sidelink channel access including resources for transmitting feedback on a sidelink feedback channel (PSFCH 415), additional resources for transmitting additional sidelink information on PSSCH, and additional scheduling for transmitting uplink control information (UCI 420) on a sidelink or uplink channel.

With reference to FIG. 4B, in some examples, the "direct" and "indirect" operations for Uu to PC5 COT-sharing described with reference to FIG. 4A may support sidelink operations using to search space sets (SSS) for receiving the DCI that indicates sidelink operations on a sidelink channel 430. For example, the downlink and uplink portion of a channel (e.g., DL/UL 425) may include both slot-based SS2 and mini-slot based SS1. In such examples, slot-based SSS2 may be implemented in indirect COT sharing opportunities are configured for the base station. Such indirect COT sharing using this slot-based approach may increase UE power saving on sidelink because the UE may not maintain the sidelink channel before performing LBT. Additionally or alternatively, mini-slot based SS1 may be implemented for "direct" COT sharing opportunities. In some examples, the UE may receive a grants in DCIs received from SSS1 and SSS2, where the grants are for performing LBT on the sidelink channel 430.

To fairly co-exist with WiFi and other nodes in a shared or unlicensed spectrum, the base station may further occupy the channel 400-c using mini-slot granularity. To support effective channel occupancy, the base station may also configure one or more UEs to monitor a downlink channel (e.g., PDCCH) for receiving DCI with mini-slot granularity (e.g., mini-slot granularity using SSS1). In such cases, receiving the DCI in SSS1 may allow a UE to identify a COT for the base station. Once the UE occupies or shares the base station's COT, the UE may switch from monitoring at a mini-slot level to a slot-level. Additionally or alternatively, the UE may switch from monitoring SSS1 to monitoring SSS2 for additional power savings.

Figure 5:
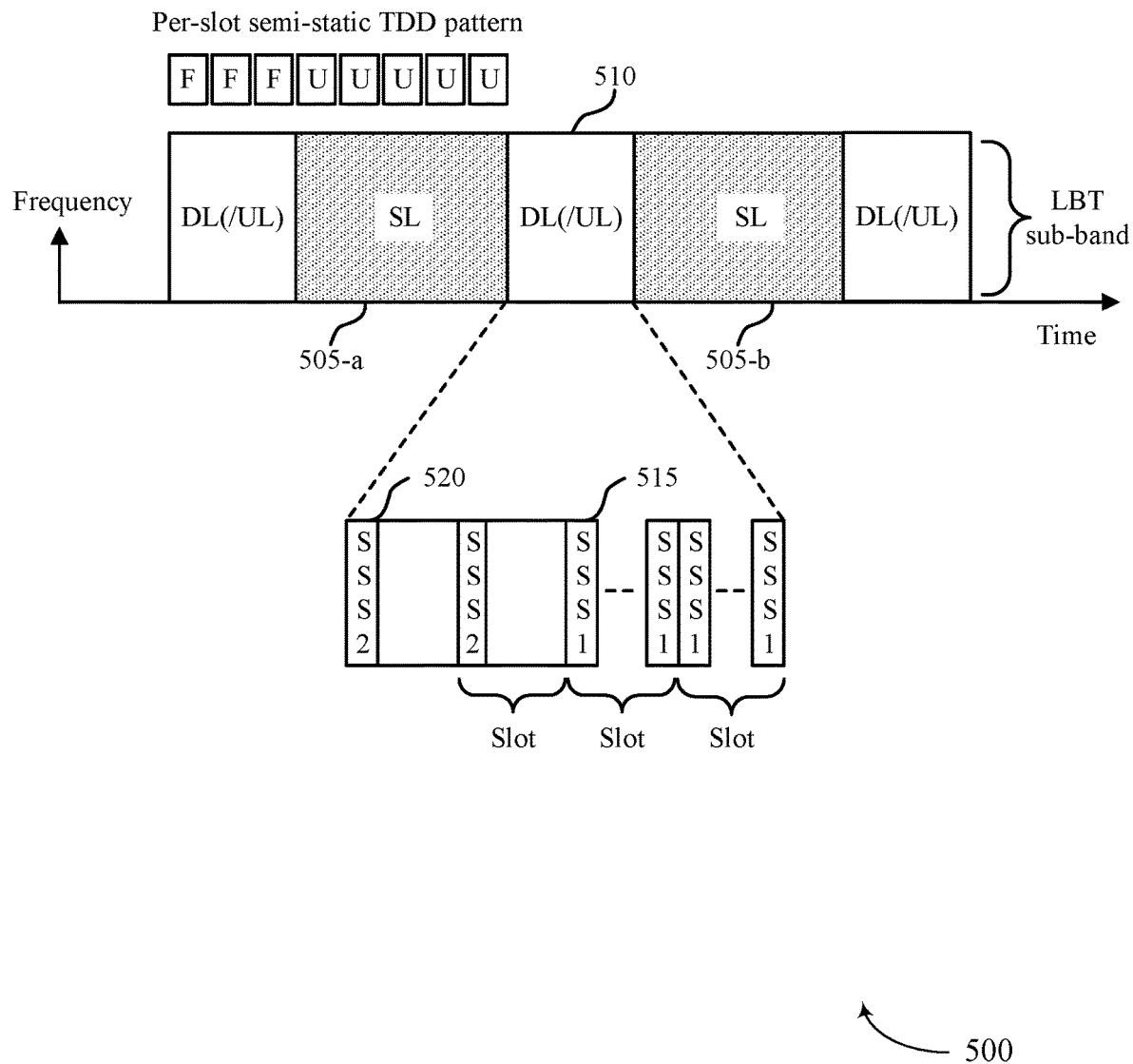
FIGS. 5, 6A, 6B, 7A, 7B, 8A, and 8B illustrate example resource pool configurations that support sidelink mode-1 based standalone operations in accordance with aspects of the present disclosure.

FIG. 5 illustrates an example of a resource pool configuration 500 that supports sidelink mode-1 based standalone operations in accordance with aspects of the present disclosure. For example, resource pool configuration 500 may support communications between wireless devices described with reference to FIGS. 1 and 2. Resource pool configuration 500 may support communications between UEs and base stations, or between other devices described herein.

Sidelink resources may be allocated to a UE operating in mode-1 over an unlicensed band via control signaling from a base station or other network entity. For example, a UE that supports LBT operations on the unlicensed band (e.g., an LBT sub-band) may receive a sidelink resource pool 505-a which is configured on semi-static "U" slots. The unlicensed channel may also include a number of time an frequency allocations for uplink and downlink communications (UL/DL) using flexible slots "F."

In some examples, to configure a grant for type-2 LBT based sidelink channel access in sidelink resource pool 505-b, the UE may in some cases receive a type-2 LBT grant during the DL/UL duration 510. The UE in some examples may receive the type-2 LBT grant via two or more DCIs received from two groups of search space sets (e.g., SSS1 515 and SSS2 520). The different search space sets may support different kinds of search space monitoring. For example, SSS1 may support mini-slot based monitoring in UL/DL 510, and SSS2 may support slot-based monitoring in UL/DL 510. The UE may use slot-based monitoring using SSS2 in cases where the time distance between the received DCI and the upcoming sidelink resource pool 505-b is relatively large compared to a threshold time distance value. The UE may use mini-slot based monitoring using SSS1 in cases that the time distance between the received DCI and the upcoming sidelink resource pool 505-b is less than a threshold time distance value.

Figure 6A:
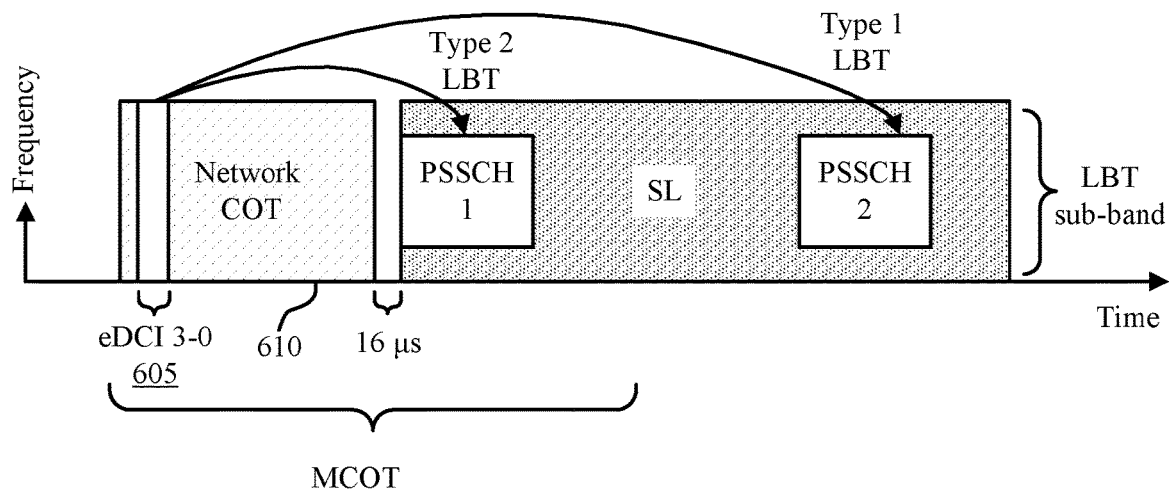
Figure 6B:
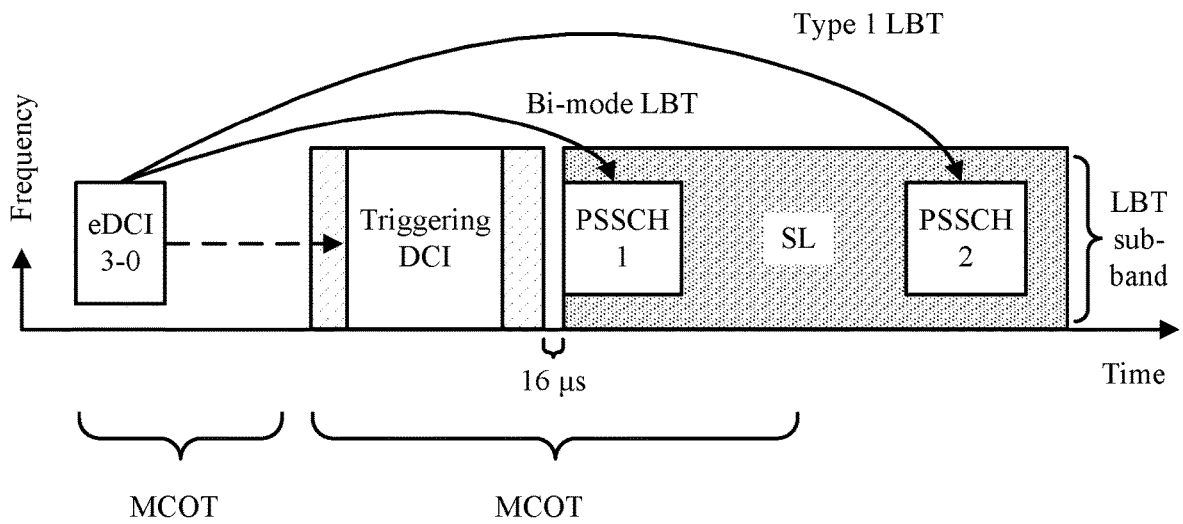

FIGS. 6A and 6B illustrate examples of resource pool configurations 600-a and 600-b that support sidelink mode-1 based standalone operations in accordance with aspects of the present disclosure. For example, resource pool configurations 600-a and 600-b may support communications between wireless devices described with reference to FIGS. 1 and 2. Resource pool configurations 600-a and 600-b may support communications between a UEs and base stations, or between other devices described herein.

With reference to FIG. 6A, in some examples, the UE described with reference to FIG. 5 may receive an extended DCI 605 (e.g., a DCI 3-0 or eDCI 3-0), which grants a subset of PSCCH(s) or PSSCH(s) (e.g., PSSCH 1 and PSSCH 2) to be transmitted based on Type 2 LBT and Type 1 LBTon the sidelink channel. In such examples, the base station may maintain a COT (e.g., COT 610) before the instant that the UE performs the indicated Type 2 LBT. For example, the base station may maintain the COT by transmitting either downlink data or sidelink grants to other sidelink UEs in order to keep the channel occupied before the 16 µs gap and the beginning of the PSSCH 1 transmission. In some examples, the may transmit a CP extension before an AGC symbol to maintain the gap. Additionally or alternatively, the eDCI 3-0 may indicate whether the UE may transmit corresponding sidelink feedback (e.g., PSFCH(s)) with a Type 2 LBT. In cases that Type 2 LBT is supported, the UE may forward an indication of the PSFCH and type-2 LBT procedure to receiving sidelink UEs when requesting a HARQ response from the receiving UEs.

In some other cases, for example, in FIG. 6B, the UE described with reference to FIG. 5 may receive an extended DCI 605 (e.g., a DCI 3-0 or eDCI 3-0) from SSS2 which indicates bi-mode LBT operation for a subset of PSCCH(s) or PSSCH(s) (e.g., PSSCH 1 and PSSCH 2). For example, the eDCI may indicate Type 1 LBT as the default LBT, and may indicate that Type 2 LBT may be used opportunistically based on whether the UE receives a "triggering DCI" after the eDCI (e.g., in SSS1) which indicates COT sharing from the base station. In such examples, the triggering DCI may also indicate whether corresponding PSFCH(s) can be transmitted via Type 2 LBT.

In some examples, the triggering DCI may be a DCI 2-0 (e.g., a COT SI), another DCI 3-0 with a specific triggering field, or other DCI format which triggers activation of the eDCI. In some cases, the base station may transmit the triggering DCI (e.g., DCI 2-0) over a group common (GC) PDCCH. In such cases, the triggering DCI (DCI 2-0) may trigger one or more extended DCIs associated with multiple different sidelink transmitting UEs for slot-based monitoring for GC-PDCCH.

Additionally or alternatively, the eDCI may be a "triggering DCI 3-0" to be transmitted over a UE specific search space. For example, a "triggering DCI 3-0" may be an existing DCI 3-0 (e.g., which indicates granted SL resources) with a specific triggering field for activating a second DCI, or by a different format of DCI 3-0 (e.g., without indicating granted SL resources) that is used specifically for triggering activation of the first DCI. In some examples, the "triggering DCI 3-0" may trigger multiple previous DCI 3-0s sent to the same sidelink UE.

Figure 7A:
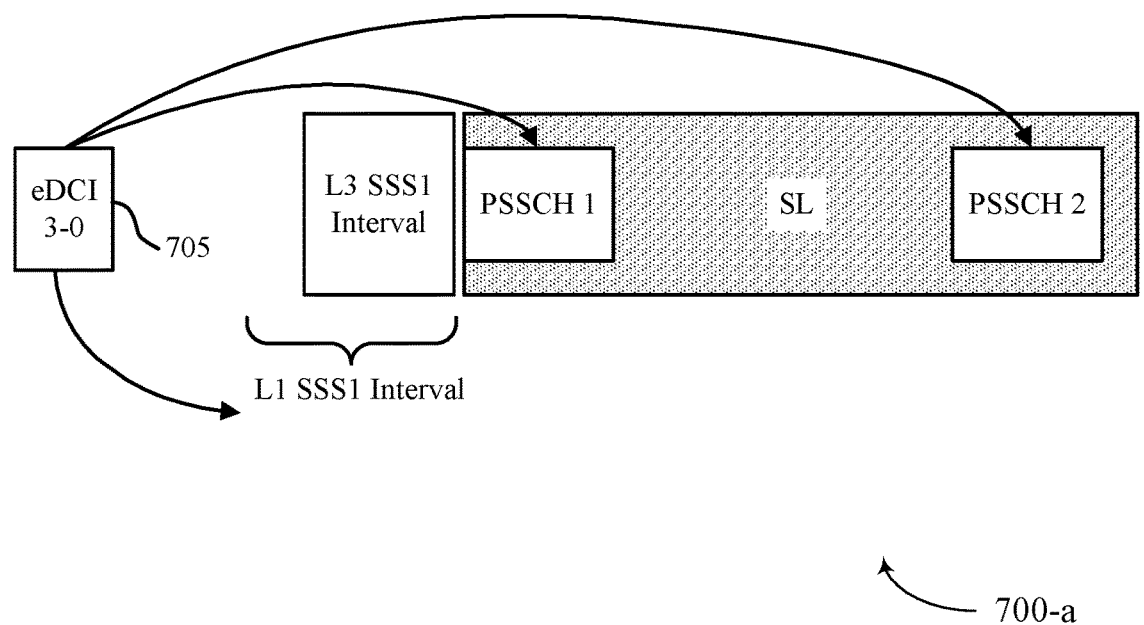
Figure 7B:
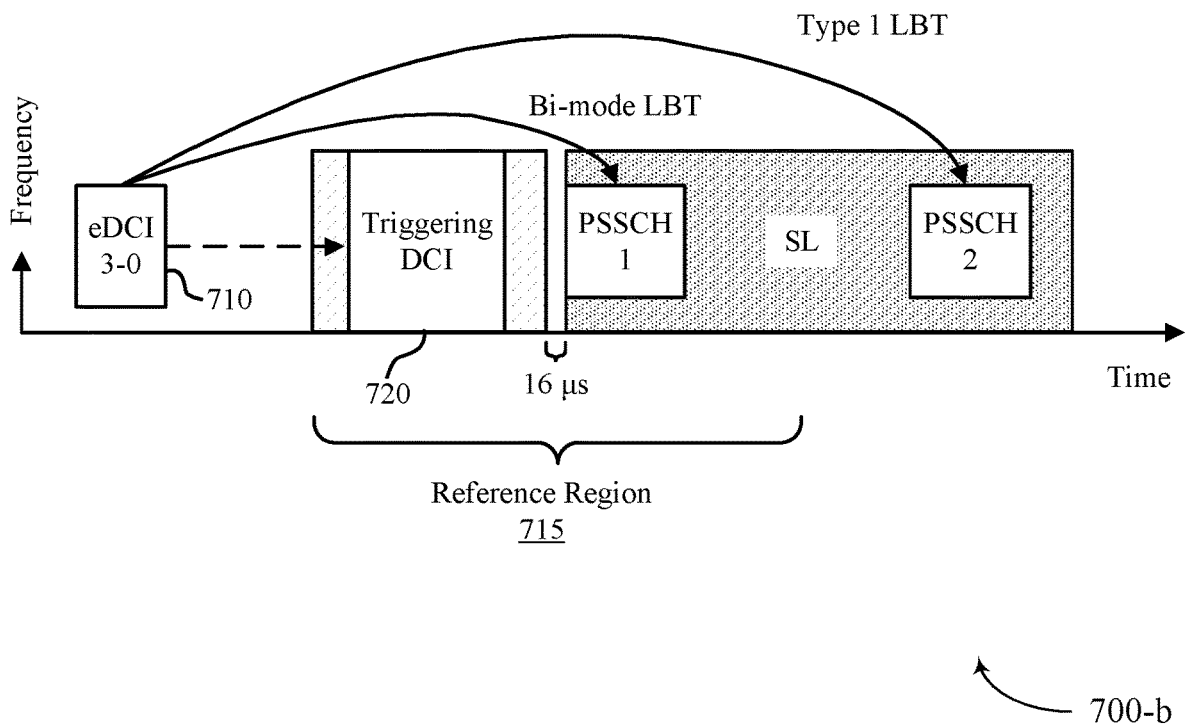

FIGS. 7A and 7B illustrate example resource pool configurations 700-a and 700-b that support sidelink mode-1 based standalone operations in accordance with aspects of the present disclosure. For example, resource pool configurations 700-a and 700-b may support communications between wireless devices described with reference to FIGS. 1 and 2. Resource pool configurations 700-a and 700-b may support communications between a UEs and base stations, or between other devices described herein.

Regarding FIG. 7A, in some implementations, a UE may receive a triggering DCI 705 (e.g., eDCI 3-0) such as a triggering DCI described with reference to FIG. 7B. The triggering DCI 705 may include a field which indicates that the UE switches from slot-based monitoring of a search space set (e.g., slot based monitoring of SSS2) to mini-slot based monitoring of a different search space set (e.g., mini-slot based monitoring of SSS1) at a specified instant that is different from a fixed value (e.g., the specified instant that the UE is granted to perform a type-2 LBT).

In such examples, the triggering DCI 705 (e.g., eDCI 3-0) may include carry a one-bit trigger which prompts the UE to switch immediately to the mini-slot based monitoring (e.g., from the next slot). In some other examples, the triggering DCI may include a multi-bit trigger to prompt the DCI to switch to mini-slot based monitoring of SSS1 in accordance with an offset with respect to the (L3) pre-fixed value for type-2 LBT.

Regarding FIG. 7B, in some cases, a DCI 710 (which may be an example of an eDCI 3-0 described herein) may further indicate a set of UCI resource to report whether the UE receives non-discontinuous reception (DTX) responses from corresponding receiver UEs for PSSCHs transmitted in a pre-defined reference region 715. The UE may transmit a negative acknowledgement (NACK) feedback message to facilitate contention window (CW) updating at a base station if it performed a Type 2 LBT for this PSSCH as indicated by DCI. In some other examples, the UE may transmit a NACK to facilitate CW updating if it received a DTX after requesting a HARQ response. In such examples, DTX may happen when the intended receiver UE fails to decode sidelink control information, which is a reasonable indication of collision due to improper contention window set up by the base station. In some cases, the UE may send a UCI report to indicate a CW update for the COT when the base station sends the triggering DCI 720.

Figure 8A:
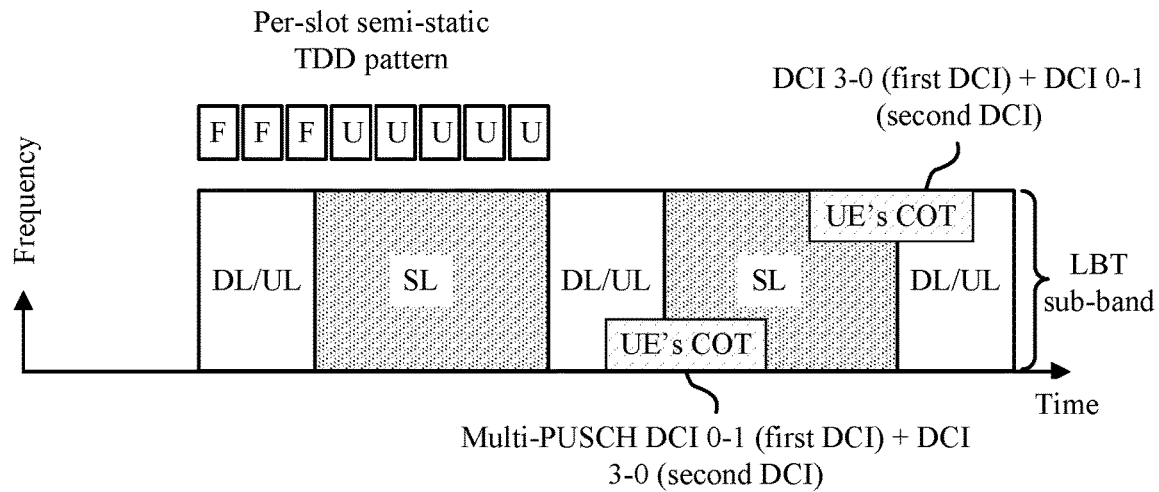
Figure 8B:
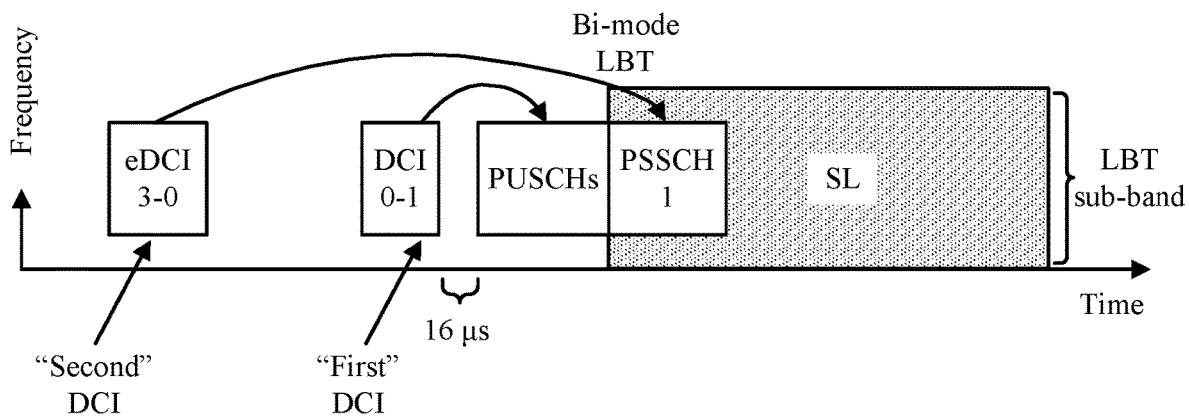

FIGS. 8A and 8B illustrate examples of resource pool configurations 800-*a* and 800*b* that support sidelink mode-1 based standalone operations in accordance with aspects of the present disclosure. For example, resource pool configurations 800-*a* and 800-*b* may support communications between wireless devices described with reference to FIGS. 1 and 2. Resource pool configurations 800-*a* and 800-*b* may support communications between a UEs and base stations, or between other devices described herein.

With reference to FIG. 8A, in some examples, the UE may receive coupled DCIs which grant both sidelink and uplink communications to occur within a same COT. For example, the UE may be scheduled by a base station or other network entity to transmit both sidelink and uplink in the same COT. The COT transmissions can be scheduled via coupling DCIs. For example a first DCI (e.g., either DCI 0-1 or eDCI 3-0) grants a temporally sooner transmission using a Type 1 LBT in the first COT, while a second DCI (e.g., either eDCI 3-0 or DCI 0-1) grants a temporally later transmission and indicates a bi-mode LBT in the second COT.

Using Type 2 LBT together with proper CP extension, if the first granted transmission passes Type 1 LBT, the UE will transmit with equal or smaller transmission power in the second TX relative to the first transmission power.

Regarding FIG. 8B, in some other examples, the first DCI (e.g., which may be an example of the first DCI described with reference to FIG. 8A which grants the temporally sooner transmission), may indicate a Type-2 LBT to access a COT shared by the base station for uplink or sidelink transmissions (e.g., instead of granting a Type-1 LBT to be performed by the UE). In some cases, the first DCI (e.g., DCI 0-1) may grant mini-slot based monitoring for multiple PUSCHs. Additionally or alternatively, the first DCI may be an example of a DCI which grants SRS transmissions for the UE.

In some examples, for a sidelink resource pool described herein, a UE may be further configured (e.g., for configured grant sidelink operations) to search for a triggering DCI (either DCI 2-0 or light-weight triggering DCI 3-0) to seek an opportunity for performing Type 2 LBT based channel access. In addition, the UE may be further configured to autonomously "couple" sidelink and uplink transmissions that occur in the same COT. In some examples, the UE may couple a sidelink CG (e.g., second DCI) to an uplink dynamic grant (DG) or to an uplink CG. In some other examples, the UE may couple an uplink CG (e.g., second DCI) to a sidelink DG or to a sidelink CG. Additionally or alternatively, the UE nay receive a DCI (e.g., an eDCI 0-1 or an eDCI 3-0) which indicates the coupling of a CG to a DG in the same COT.

Figure 9:
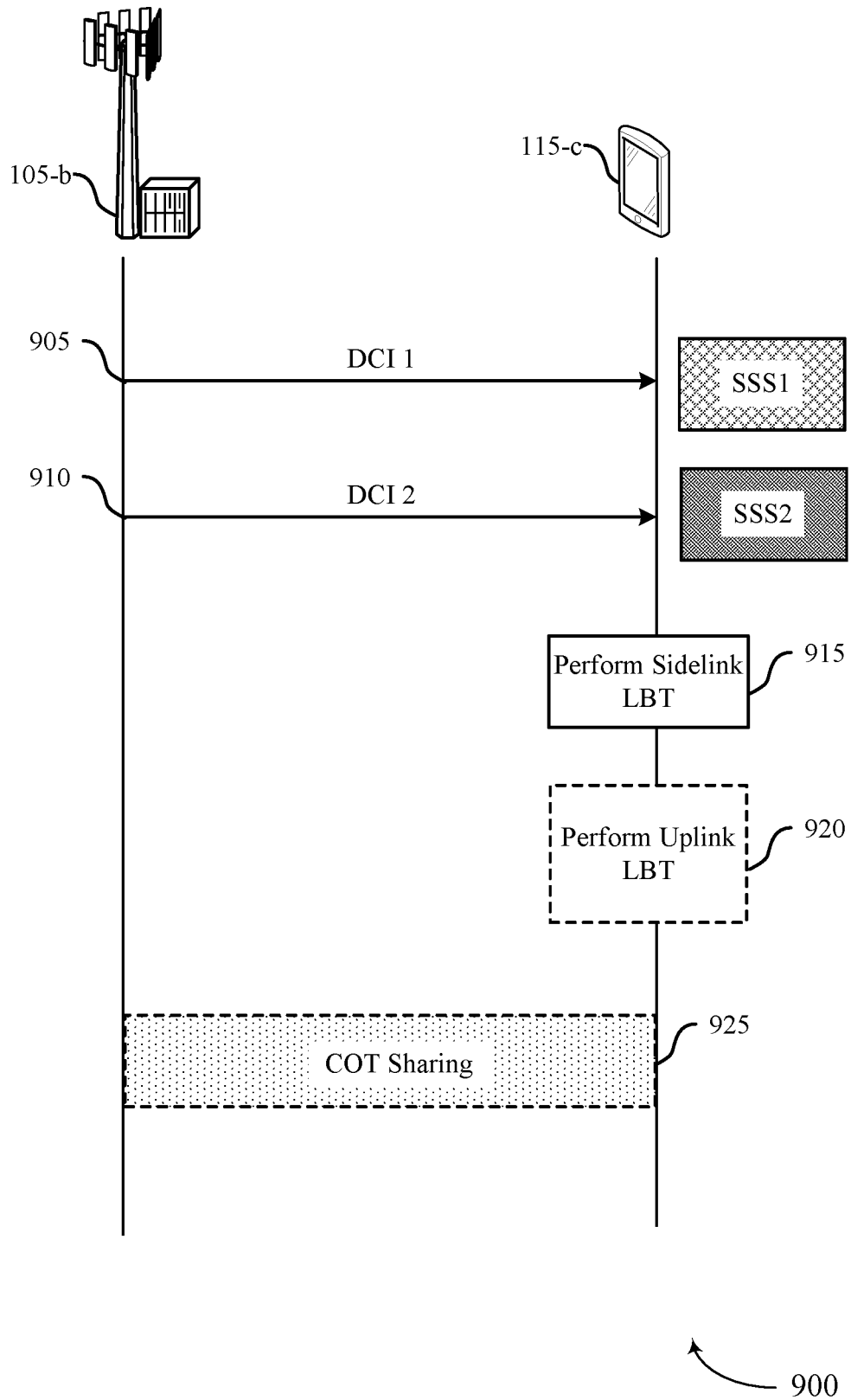
FIG. 9 illustrates an example of a process flow that supports sidelink mode-1 based standalone operations in accordance with aspects of the present disclosure.

FIG. 9 illustrates an example of a process flow 900 that supports sidelink mode-1 based standalone operations in accordance with aspects of the present disclosure. The process flow 900 may implement aspects of wireless communications systems 100 and 200, or may be implemented by aspects of the wireless communications systems 100 and 200. For example, the process flow 900 may illustrate operations between a UE 115-*c* and base station 105-*b*, which may be examples of corresponding devices described with reference to FIGS. 1 and 2. In the following description of the process flow 900, the operations between the devices may be transmitted in a different order than the example order shown, or the operations may be performed in different orders or at different times or by different devices. Additionally or alternatively, some operations may also be omitted from the process flow 900, and other operations may be added to the process flow 900.

At 905, the UE 115-*c* may receive, from the base station 105-*b*, first DCI associated with a first search space (e.g., SSS1) of the UE 115-*c*, the first DCI indicating an LBT grant for accessing a sidelink channel. In some cases, the first search space may be associated with mini-slot-based monitoring. Further, in some examples, the LBT grant may be a first LBT grant for accessing the sidelink channel during a first COT.

In some cases, the first DCI may be an extended DCI (e.g., an eDCI), and the eDCI includes an LBT grant which indicates a subset of sidelink shared channel transmissions, a subset of sidelink control channel transmissions, or both, based on the LBT procedure of the LBT grant. In some examples, the UE 115-*c* may identify a set of sidelink feedback channel resources for transmitting HARQ information corresponding to the subset of sidelink shared channel transmissions, the subset of sidelink control channel transmissions, or both. The UE 115-*c* may then transmit an indication of the set of sidelink feedback channel resources to at least a second UE that the first UE 115-*c* may communicate with over the sidelink channel.

In some examples, the first DCI may be an eDCI which indicates an LBT type for the LBT procedure (e.g., type-1 LBT or type-2 LBT), and the UE 115-*c* may perform a type-1 LBT procedure or a type-2 LBT procedure. In cases that the UE 115-*c* performs the type-2 LBT procedure, the first DCI may be an eDCI and the second DCI may be a triggering DCI, were the triggering DCI indicates a shared COT for the UE and the base station, and triggers activation of the type 2 LBT grant of the eDCI. In some examples, the triggering DCI further indicates a corresponding set of sidelink feedback resources associated with the type-2 LBT. The triggering DCI may also include a first DCI format to trigger the extended DCI or a second DCI format having a triggering field.

At 910, the UE 115-*c* may receive from the base station 105-*b*, a second DCI associated with a second search space (e.g., SSS2) of the UE 115-*c*, the first DCI indicating an activation trigger for the LBT grant of the first DCI. In some cases, the second search space may be associated with slot-based monitoring. Further, in some examples, the LBT grant of the second DCI may be a second LBT grant for accessing the sidelink channel during the first COT. In some examples, the first DCI and the second DCI may be coupled together.

In some implementations, the first DCI may be an eDCI which indicates switching between the first search space of the UE (SSS1) to the second search space of the UE (SSS2). In such implementations, the eDCI may include a one-bit trigger or a multi-bit trigger for the UE to switch between monitoring the first search space of the UE to the second search space of the UE.

In some examples, the UE 115-*c* may receive an indication of an uplink resource for transmitting UCI to report whether the UE 115-*c* received one or more DTX messages from at least a second UE during a portion of the sidelink channel. In such examples, the UE 115-*c* may transmit a NACK on the uplink resource as part of the UCI to indicate a contention window update for the base station 105-*b*.

At 915, the UE 115-*c* may perform a sidelink LBT procedure to access a sidelink channel in accordance with the LBT grant received via the first DCI and the second DCI. For example, the UE may perform the sidelink LBT procedure based on the first DCI triggering the second DCI. In some cases, the UE 115-c may perform the sidelink LBT during a first COT.

At 920, the UE 115-c may optionally perform a second LBT procedure to access an uplink channel during the first COT. For example, the UE 115-c and the base station 105-b may support COT sharing 925 for the sidelink LBT and uplink LBT procedures for the UE 115-c. Such COT sharing may be indicated by the first DCI or by the second DCI. In some examples, the first LBT is a type-1 LBT and the second LBT is a type-2 LBT.

The UE 115-c may be further configured to couple configured grants associated with sidelink or uplink transmissions during the shared COT. For example, the UE 115-c may couple a sidelink configured grant with a corresponding configured grant for uplink or a dynamic grant for uplink during the shared COT, or the UE 115-c may couple an uplink configured grant with a corresponding configured grant for sidelink or a dynamic grant for sidelink during the shared COT. In some cases, the UE 115-c may receive a third DCI indicating a coupling of a configured grant for uplink or sidelink communications to a dynamic grant for uplink or sidelink communications during the shared COT.

In some examples, the UE 115-c may transmit the sidelink transmission associated with the sidelink LBT using a first transmission power, and may transmit the uplink transmission associated with the uplink LBT using a second transmission power that is less than or equal to the first transmission power.

Figure 10:
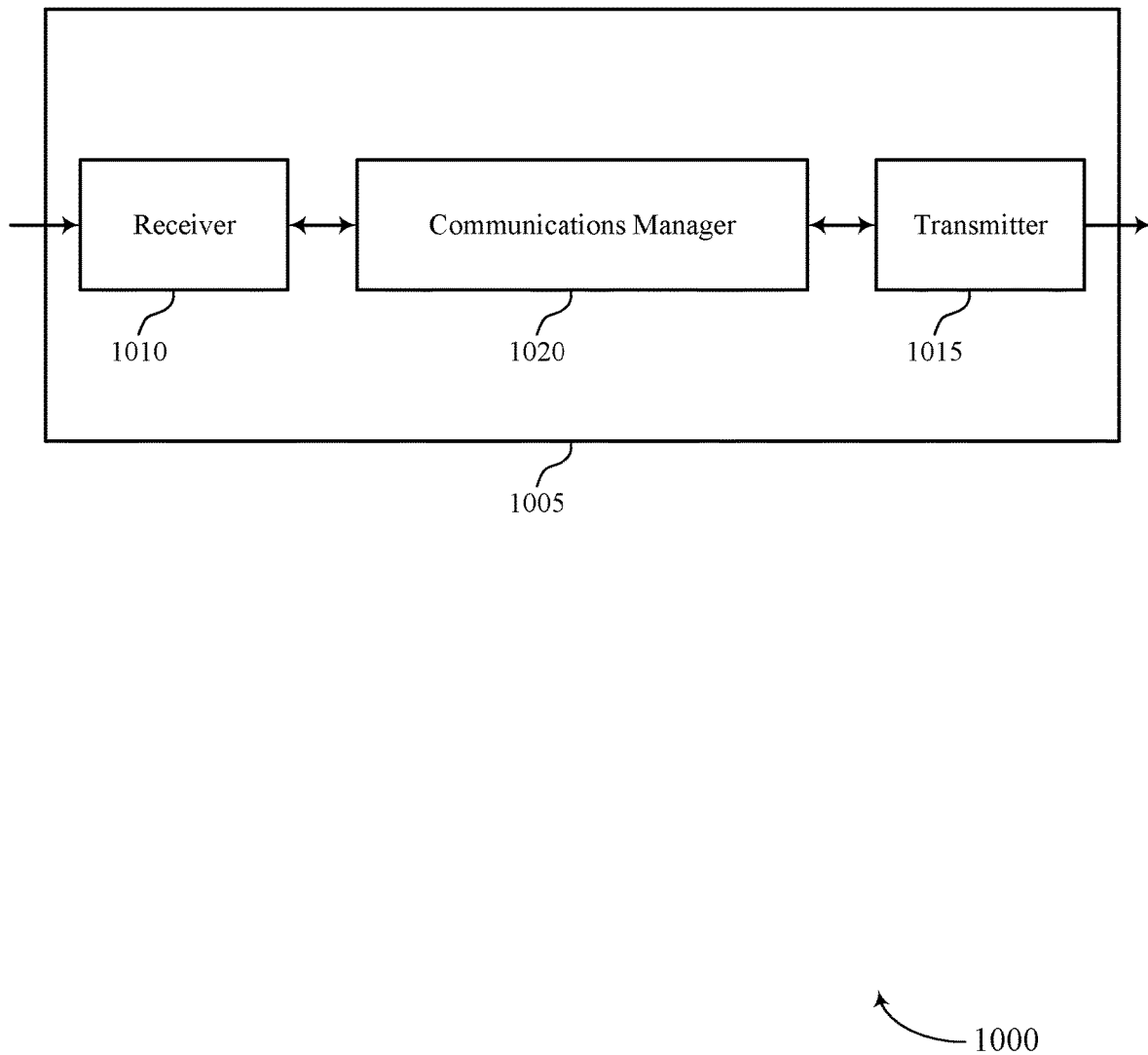
FIGS. 10 and 11 show block diagrams of devices that support sidelink mode-1 based standalone operations in accordance with aspects of the present disclosure.

FIG. 10 shows a block diagram 1000 of a device 1005 that supports sidelink mode-1 based standalone operations in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to sidelink mode-1 based standalone operations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to sidelink mode-1 based standalone operations). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of sidelink mode-1 based standalone operations as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE operating in an unlicensed band in accordance with examples as disclosed herein. For example, the communications manager 1020 may be configured as or otherwise support a means for receiving, from a network entity, first DCI associated with a first search space of the UE, the first DCI indicating an LBT grant for accessing a sidelink channel. The communications manager 1020 may be configured as or otherwise support a means for receiving, from the network entity, second DCI associated with a second search space of the UE, the second DCI including an activation trigger for the LBT grant of the first DCI. The communications manager 1020 may be configured as or otherwise support a means for performing an LBT procedure to access the sidelink channel in accordance with the LBT grant indicated by the first DCI and the second DCI.

Additionally or alternatively, the communications manager 1020 may support wireless communications at a UE operating in an unlicensed band in accordance with examples as disclosed herein. For example, the communications manager 1020 may be configured as or otherwise support a means for receiving, from a network entity, first DCI associated with a first search space of the UE, the first DCI indicating a first LBT grant for accessing a sidelink channel during a first COT. The communications manager 1020 may be configured as or otherwise support a means for receiving, from the network entity, second DCI associated with a second search space of the UE, the second DCI indicating a second LBT grant for accessing an uplink channel during the first COT, the second DCI being coupled with the first DCI. The communications manager 1020 may be configured as or otherwise support a means for performing the first LBT procedure to access the sidelink channel during the first COT in accordance with the first LBT grant. The communications manager 1020 may be configured as or otherwise support a means for performing a second LBT procedure to access the uplink channel during the first COT in accordance with the second LBT grant.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced power consumption and more efficient utilization of communication resources for scheduling uplink and sidelink communications.

Figure 11:
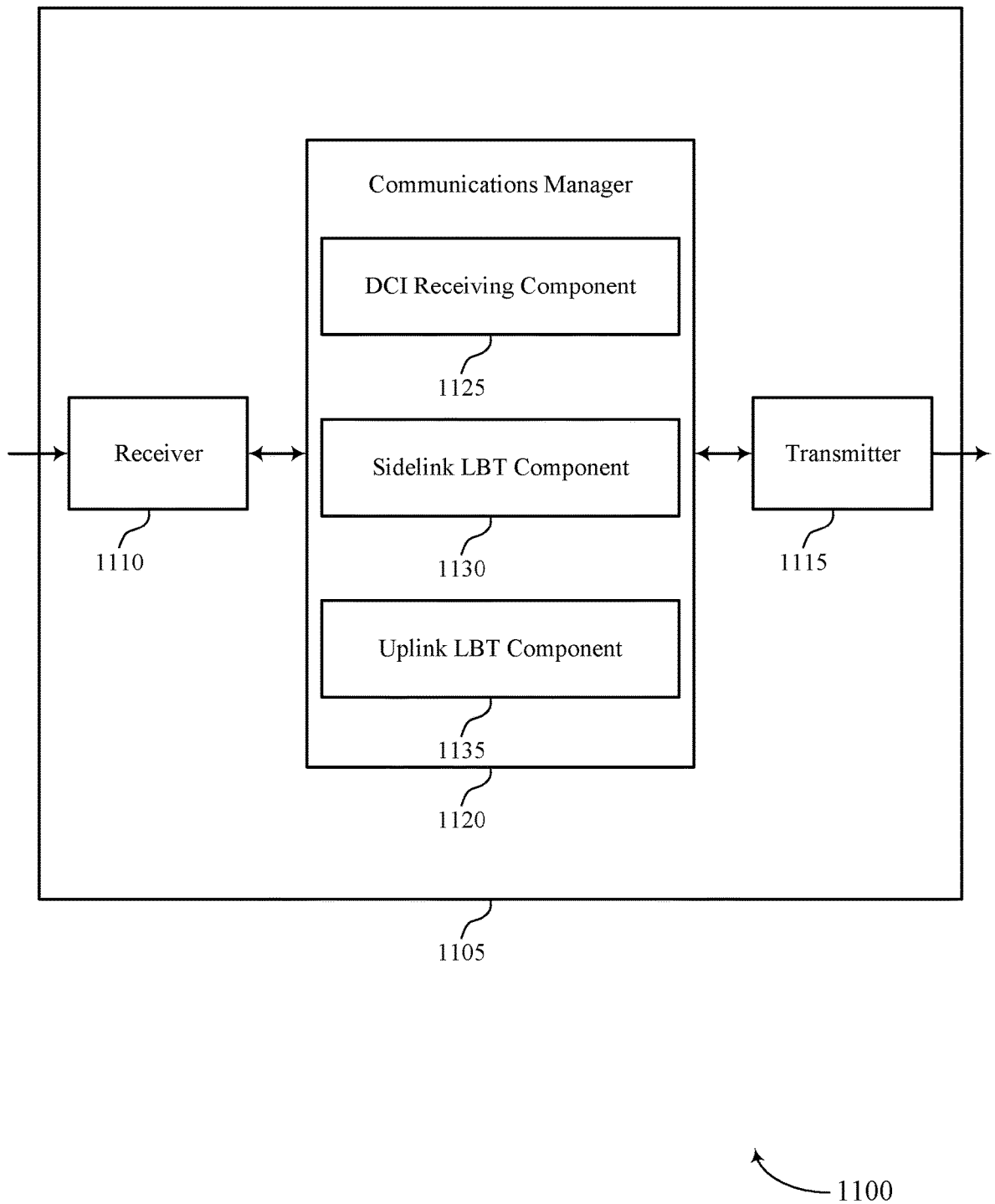

FIG. 11 shows a block diagram 1100 of a device 1105 that supports sidelink mode-1 based standalone operations in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to sidelink mode-1 based standalone operations). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to sidelink mode-1 based standalone operations). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of sidelink mode-1 based standalone operations as described herein. For example, the communications manager 1120 may include a DCI receiving component 1125, a sidelink LBT component 1130, an uplink LBT component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE operating in an unlicensed band in accordance with examples as disclosed herein. The DCI receiving component 1125 may be configured as or otherwise support a means for receiving, from a network entity, first DCI associated with a first search space of the UE, the first DCI indicating an LBT grant for accessing a sidelink channel. The DCI receiving component 1125 may be configured as or otherwise support a means for receiving, from the network entity, second DCI associated with a second search space of the UE, the second DCI including an activation trigger for the LBT grant of the first DCI. The sidelink LBT component 1130 may be configured as or otherwise support a means for performing an LBT procedure to access the sidelink channel in accordance with the LBT grant indicated by the first DCI and the second DCI.

Additionally or alternatively, the communications manager 1120 may support wireless communications at a UE operating in an unlicensed band in accordance with examples as disclosed herein. The DCI receiving component 1125 may be configured as or otherwise support a means for receiving, from a network entity, first DCI associated with a first search space of the UE, the first DCI indicating a first LBT grant for accessing a sidelink channel during a first COT. The DCI receiving component 1125 may be configured as or otherwise support a means for receiving, from the network entity, second DCI associated with a second search space of the UE, the second DCI indicating a second LBT grant for accessing an uplink channel during the first COT, the second DCI being coupled with the first DCI. The sidelink LBT component 1130 may be configured as or otherwise support a means for performing the first LBT procedure to access the sidelink channel during the first COT in accordance with the first LBT grant. The uplink LBT component 1135 may be configured as or otherwise support a means for performing a second LBT procedure to access the uplink channel during the first COT in accordance with the second LBT grant.

Figure 12:
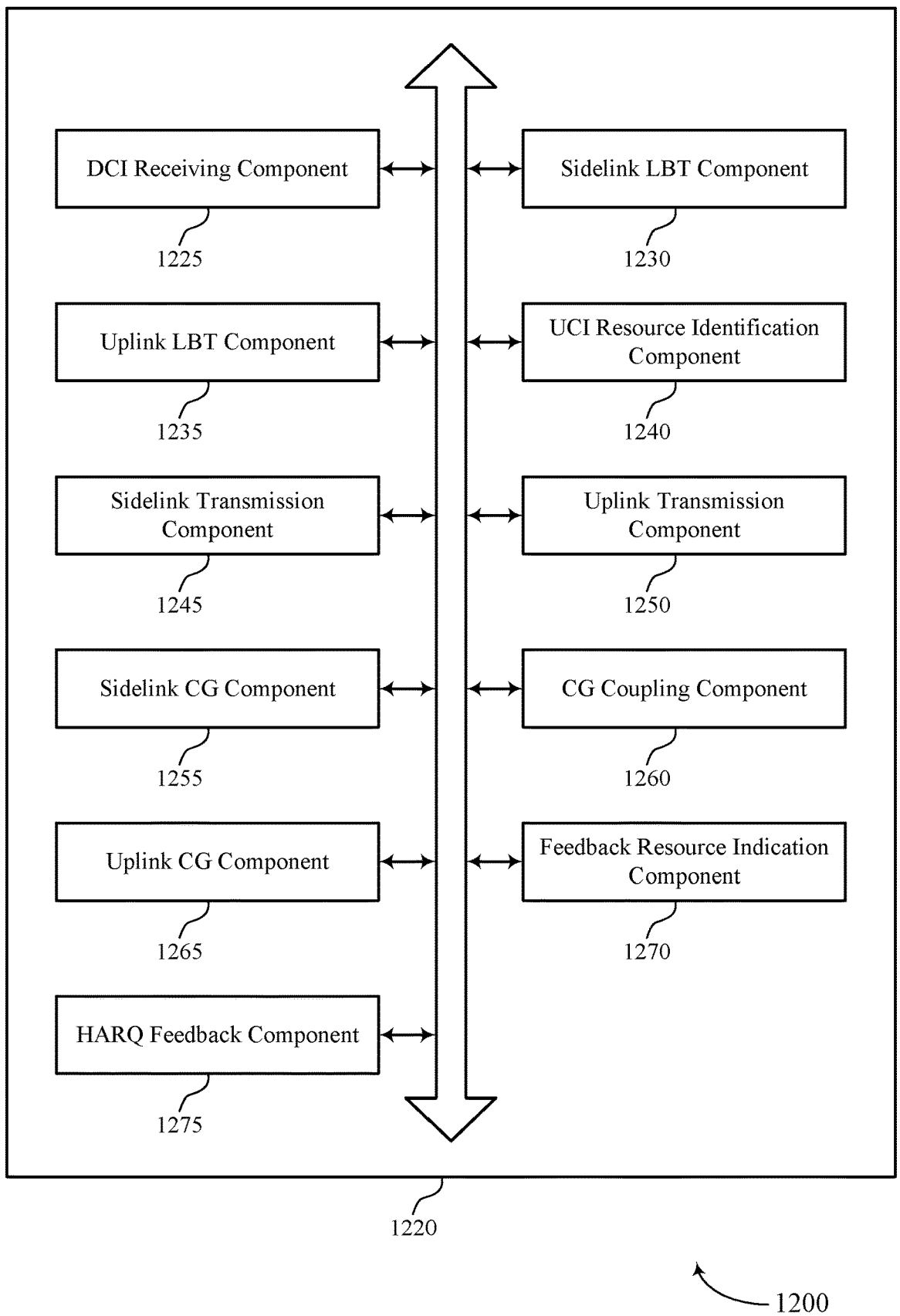
FIG. 12 shows a block diagram of a communications manager that supports sidelink mode-1 based standalone operations in accordance with aspects of the present disclosure.

FIG. 12 shows a block diagram 1200 of a communications manager 1220 that supports sidelink mode-1 based standalone operations in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of sidelink mode-1 based standalone operations as described herein. For example, the communications manager 1220 may include a DCI receiving component 1225, a sidelink LBT component 1230, an uplink LBT component 1235, a UCI resource identification component 1240, a sidelink transmission component 1245, an uplink transmission component 1250, a sidelink CG component 1255, a CG coupling component 1260, an uplink CG component 1265, a feedback resource indication component 1270, an HARQ feedback component 1275, or any combination thereof. Each of these components may communicate, directly or indirectly, with one another (e.g., via one or more buses).

The communications manager 1220 may support wireless communication at a UE operating in an unlicensed band in accordance with examples as disclosed herein. The DCI receiving component 1225 may be configured as or otherwise support a means for receiving, from a network entity, first DCI associated with a first search space of the UE, the first DCI indicating an LBT grant for accessing a sidelink channel. In some examples, the DCI receiving component 1225 may be configured as or otherwise support a means for receiving, from the network entity, second DCI associated with a second search space of the UE, the second DCI including an activation trigger for the LBT grant of the first DCI. The sidelink LBT component 1230 may be configured as or otherwise support a means for performing an LBT procedure to access the sidelink channel in accordance with the LBT grant indicated by the first DCI and the second DCI.

In some examples, the sidelink LBT component 1230 may be configured as or otherwise support a means for performing the LBT procedure to access the sidelink channel based on the second DCI triggering the first DCI.

In some examples, the first DCI includes an extended DCI, and the DCI receiving component 1225 may be configured as or otherwise support a means for receiving, from the network entity, the extended DCI indicating the LBT grant, where the LBT grant indicates a subset of sidelink shared channel transmissions, a subset of sidelink control channel transmissions, or both, based on the LBT procedure.

In some examples, the feedback resource indication component 1270 may be configured as or otherwise support a means for determining, based on the extended DCI, a set of sidelink feedback channel resources for transmitting HARQ information corresponding to the subset of sidelink shared channel transmissions, the subset of sidelink control channel transmissions, or both. In some examples, the feedback resource indication component 1270 may be configured as or otherwise support a means for transmitting an indication of the set of sidelink feedback channel resources to at least a second UE.

In some examples, the first DCI includes an extended DCI indicating an LBT type for the LBT procedure, and the sidelink LBT component 1230 may be configured as or otherwise support a means for performing a type-1 LBT procedure to access the sidelink channel based on the extended DCI.

In some examples, the first DCI includes an extended DCI indicating an LBT type for the LBT procedure and the second DCI includes a triggering DCI, and the sidelink LBT component 1230 may be configured as or otherwise support a means for performing a type-2 LBT procedure to access the sidelink channel based on the extended DCI and the triggering DCI, where the triggering DCI indicates a shared COT for the UE and the network entity.

In some examples, the triggering DCI further indicates a corresponding set of sidelink feedback resources associated with the type-2 LBT.

In some examples, the triggering DCI includes a first DCI format to trigger the extended DCI or a second DCI format having a triggering field.

In some examples, the first DCI includes an extended DCI indicating switching between the first search space of the UE to the second search space of the UE.

In some examples, the extended DCI includes a one-bit trigger for the UE to switch between monitoring the first search space of the UE to the second search space of the UE.

In some examples, the extended DCI includes a set of multiple bits indicating a monitoring offset and a trigger for the UE to switch between monitoring the first search space of the UE to the second search space of the UE.

In some examples, the UCI resource identification component 1240 may be configured as or otherwise support a means for receiving, from the network entity, an indication of an uplink resource for transmitting UCI to report whether the UE received one or more discontinuous transmissions from at least a second UE during a portion of the sidelink channel.

In some examples, the HARQ feedback component 1275 may be configured as or otherwise support a means for transmitting, to the network entity, a negative acknowledgement on the uplink resource as part of the UCI to indicate a contention window update based on the one or more discontinuous transmissions.

In some examples, the first search space and the second search space include slot-based search space sets, mini-slot-based search space sets, or a combination thereof.

In some examples, the LBT procedure includes a type-2 LBT procedure.

Additionally or alternatively, the communications manager 1220 may support wireless communications at a UE operating in an unlicensed band in accordance with examples as disclosed herein. In some examples, the DCI receiving component 1225 may be configured as or otherwise support a means for receiving, from a network entity, first DCI associated with a first search space of the UE, the first DCI indicating a first LBT grant for accessing a sidelink channel during a first COT. In some examples, the DCI receiving component 1225 may be configured as or otherwise support a means for receiving, from the network entity, second DCI associated with a second search space of the UE, the second DCI indicating a second LBT grant for accessing an uplink channel during the first COT, the second DCI being coupled with the first DCI. In some examples, the sidelink LBT component 1230 may be configured as or otherwise support a means for performing the first LBT procedure to access the sidelink channel during the first COT in accordance with the first LBT grant. The uplink LBT component 1235 may be configured as or otherwise support a means for performing a second LBT procedure to access the uplink channel during the first COT in accordance with the second LBT grant.

In some examples, the first LBT includes a type-1 LBT and the second LBT includes a type-2 LBT.

In some examples, the sidelink transmission component 1245 may be configured as or otherwise support a means for transmitting a first sidelink transmission during the first COT using a first transmission power. In some examples, the uplink transmission component 1250 may be configured as or otherwise support a means for transmitting a first uplink transmission during the first COT using a second transmission power, the second transmission power being less than or equal to the first transmission power.

In some examples, the first DCI indicates that the first COT is shared by the network entity.

In some examples, the sidelink CG component 1255 may be configured as or otherwise support a means for receiving, from the network entity, a first configured grant for transmitting sidelink communications during the first COT. In some examples, the CG coupling component 1260 may be configured as or otherwise support a means for coupling the first configured grant with a corresponding configured grant for uplink or a dynamic grant for uplink during the first COT.

In some examples, the uplink CG component 1265 may be configured as or otherwise support a means for receiving, from the network entity, a second configured grant for transmitting uplink communications during the first COT. In some examples, the CG coupling component 1260 may be configured as or otherwise support a means for coupling the second configured grant with a corresponding configured grant for sidelink or a dynamic grant for sidelink during the first COT.

In some examples, the DCI receiving component 1225 may be configured as or otherwise support a means for receiving, from the network entity, third DCI indicating a coupling of a configured grant for uplink or sidelink communications to a dynamic grant for uplink or sidelink communications during the first COT.

Figure 13:
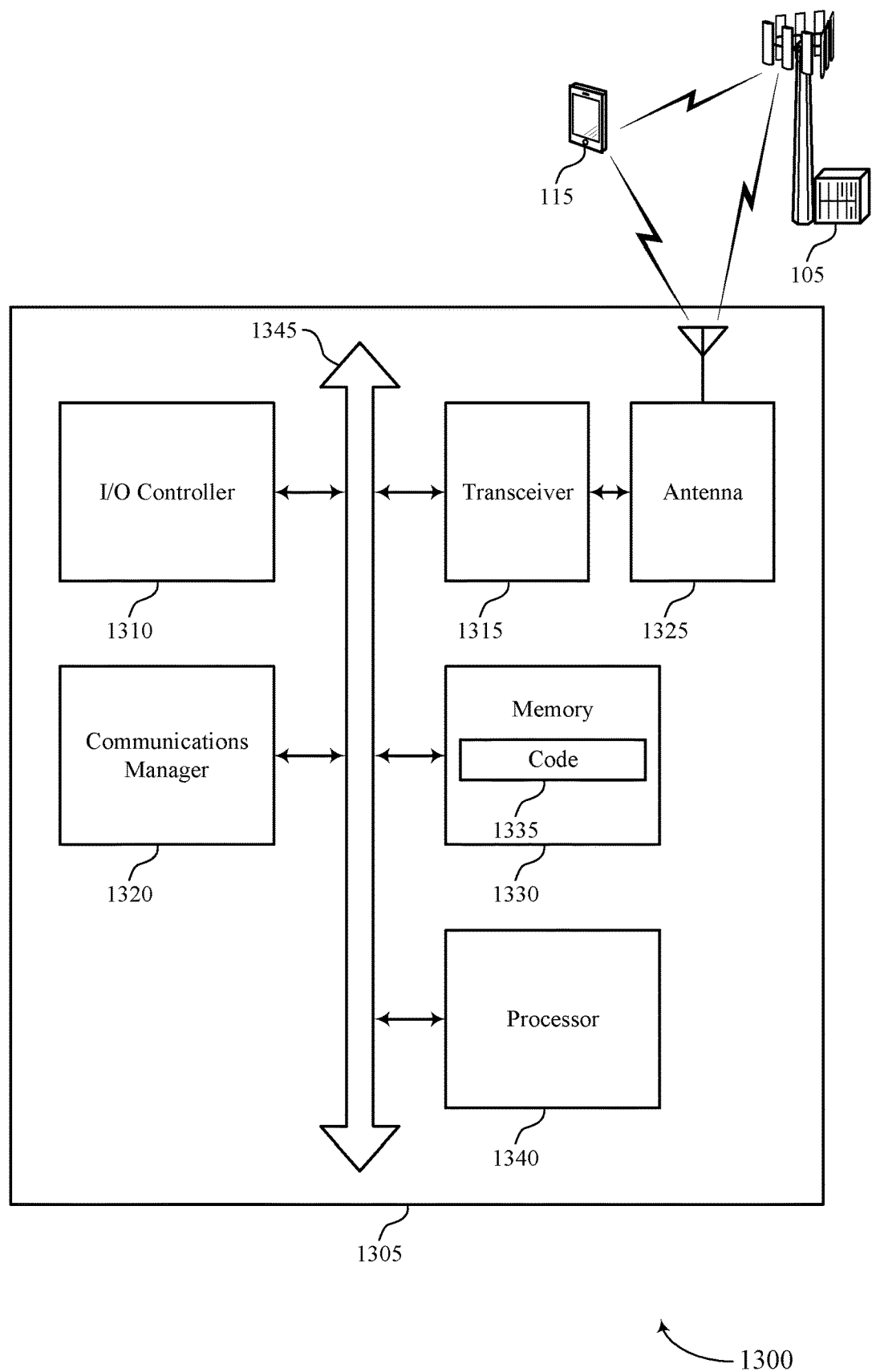
FIG. 13 shows a diagram of a system including a device that supports sidelink mode-1 based standalone operations in accordance with aspects of the present disclosure.

FIG. 13 shows a diagram of a system 1300 including a device 1305 that supports sidelink mode-1 based standalone operations in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting sidelink mode-1 based standalone operations). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a UE operating in an unlicensed band in accordance with examples as disclosed herein. For example, the communications manager 1320 may be configured as or otherwise support a means for receiving, from a network entity, first DCI associated with a first search space of the UE, the first DCI indicating an LBT grant for accessing a sidelink channel. The communications manager 1320 may be configured as or otherwise support a means for receiving, from the network entity, second DCI associated with a second search space of the UE, the second DCI including an activation trigger for the LBT grant of the first DCI. The communications manager 1320 may be configured as or otherwise support a means for performing an LBT procedure to access the sidelink channel in accordance with the LBT grant indicated by the first DCI and the second DCI.

Additionally or alternatively, the communications manager 1320 may support wireless communications at a UE operating in an unlicensed band in accordance with examples as disclosed herein. For example, the communications manager 1320 may be configured as or otherwise support a means for receiving, from a network entity, first DCI associated with a first search space of the UE, the first DCI indicating a first LBT grant for accessing a sidelink channel during a first COT. The communications manager 1320 may be configured as or otherwise support a means for receiving, from the network entity, second DCI associated with a second search space of the UE, the second DCI indicating a second LBT grant for accessing an uplink channel during the first COT, the second DCI being coupled with the first DCI. The communications manager 1320 may be configured as or otherwise support a means for performing the first LBT procedure to access the sidelink channel during the first COT in accordance with the first LBT grant. The communications manager 1320 may be configured as or otherwise support a means for performing a second LBT procedure to access the uplink channel during the first COT in accordance with the second LBT grant.

By including or configuring the communications manager 1320 in accordance with examples as described herein, the device 1305 may support techniques for improved communication reliability, reduced power consumption, more efficient utilization of communication resources, improved coordination between devices, longer battery life, reduced LBT uncertainty, and reduced RAT collisions in an unlicensed band.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of sidelink mode-1 based standalone operations as described herein, or the processor 1340 and the memory 1330 may be otherwise configured to perform or support such operations.

Figure 14:
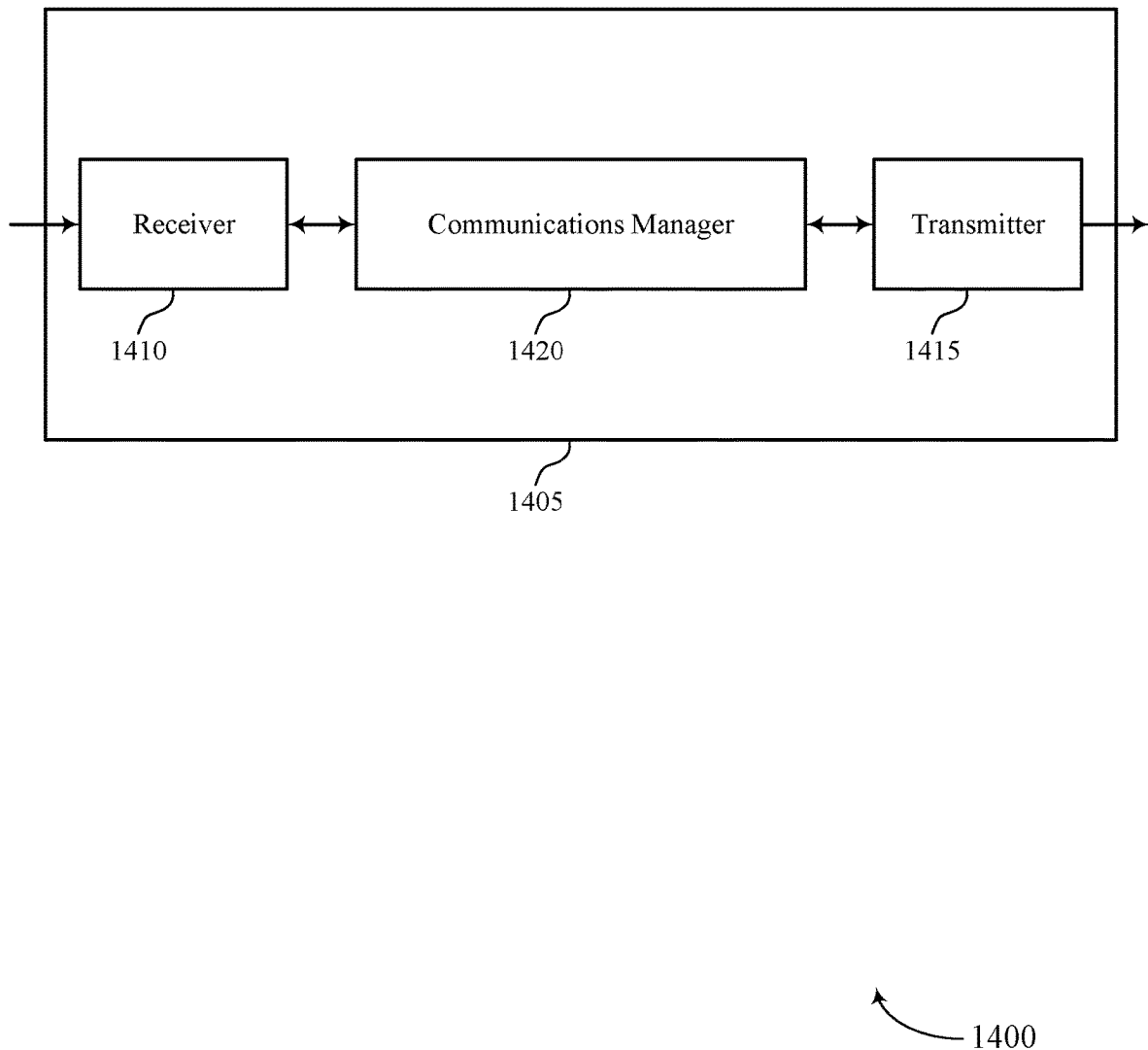
FIGS. 14 and 15 show block diagrams of devices that support sidelink mode-1 based standalone operations in accordance with aspects of the present disclosure.

FIG. 14 shows a block diagram 1400 of a device 1405 that supports sidelink mode-1 based standalone operations in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to sidelink mode-1 based standalone operations). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to sidelink mode-1 based standalone operations). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of sidelink mode-1 based standalone operations as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a network entity operating in an unlicensed band in accordance with examples as disclosed herein. For example, the communications manager 1420 may be configured as or otherwise support a means for transmitting first DCI associated with a first search space of a UE, the first DCI indicating an LBT grant for accessing a sidelink channel. The communications manager 1420 may be configured as or otherwise support a means for transmitting second DCI associated with a second search space of the UE, the second DCI including an activation trigger for the LBT grant of the first DCI.

Additionally or alternatively, the communications manager 1420 may support wireless communications at network entity operating in an unlicensed band in accordance with examples as disclosed herein. For example, the communications manager 1420 may be configured as or otherwise support a means for transmitting first DCI associated with a first search space of a UE, the first DCI indicating a first LBT grant for accessing a sidelink channel during a first COT. The communications manager 1420 may be configured as or otherwise support a means for transmitting second DCI associated with a second search space of the UE, the second DCI indicating a second LBT grant for accessing an uplink channel during the first COT, the second DCI being coupled with the first DCI.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced power consumption and more efficient utilization of communication resources.

Figure 15:
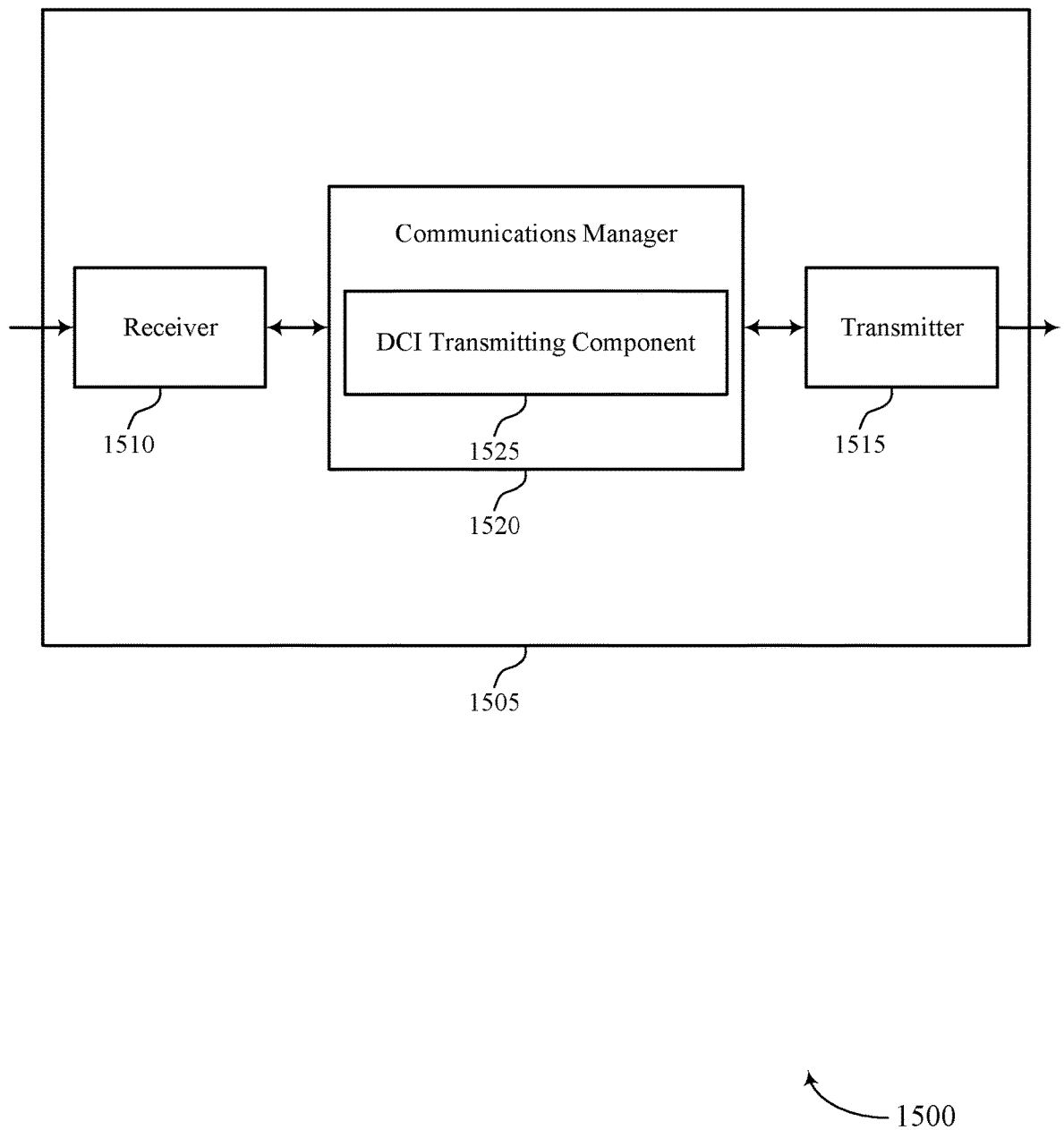

FIG. 15 shows a block diagram 1500 of a device 1505 that supports sidelink mode-1 based standalone operations in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to sidelink mode-1 based standalone operations). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to sidelink mode-1 based standalone operations). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of sidelink mode-1 based standalone operations as described herein. For example, the communications manager 1520 may include a DCI transmitting component 1525, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a network entity operating in an unlicensed band in accordance with examples as disclosed herein. The DCI transmitting component 1525 may be configured as or otherwise support a means for transmitting first DCI associated with a first search space of a UE, the first DCI indicating an LBT grant for accessing a sidelink channel. The DCI transmitting component 1525 may be configured as or otherwise support a means for transmitting second DCI associated with a second search space of the UE, the second DCI including an activation trigger for the LBT grant of the first DCI.

Additionally or alternatively, the communications manager 1520 may support wireless communications at network entity operating in an unlicensed band in accordance with examples as disclosed herein. The DCI transmitting component 1525 may be configured as or otherwise support a means for transmitting first DCI associated with a first search space of a UE, the first DCI indicating a first LBT grant for accessing a sidelink channel during a first COT. The DCI transmitting component 1525 may be configured as or otherwise support a means for transmitting second DCI associated with a second search space of the UE, the second DCI indicating a second LBT grant for accessing an uplink channel during the first COT, the second DCI being coupled with the first DCI.

Figure 16:
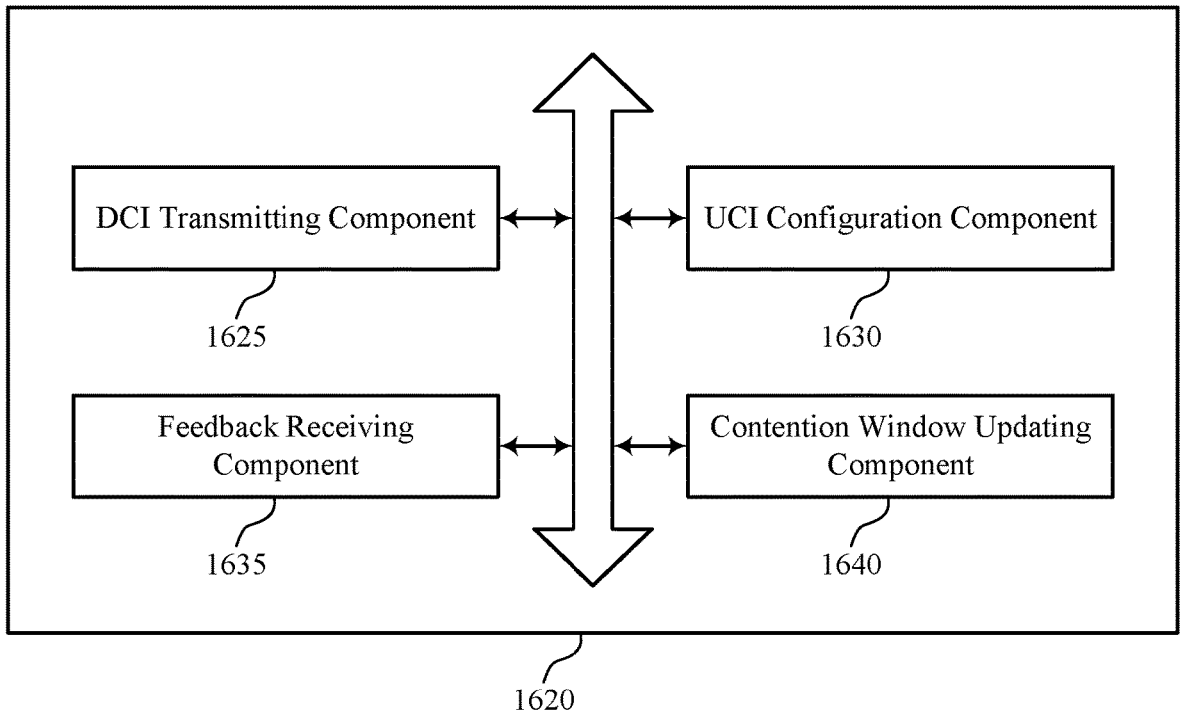
FIG. 16 shows a block diagram of a communications manager that supports sidelink mode-1 based standalone operations in accordance with aspects of the present disclosure.

FIG. 16 shows a block diagram 1600 of a communications manager 1620 that supports sidelink mode-1 based standalone operations in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of sidelink mode-1 based standalone operations as described herein. For example, the communications manager 1620 may include a DCI transmitting component 1625, a UCI configuration component 1630, a feedback receiving component 1635, a contention window updating component 1640, or any combination thereof. Each of these components may communicate, directly or indirectly, with one another (e.g., via one or more buses).

The communications manager 1620 may support wireless communication at a network entity operating in an unlicensed band in accordance with examples as disclosed herein. The DCI transmitting component 1625 may be configured as or otherwise support a means for transmitting first DCI associated with a first search space of a UE, the first DCI indicating an LBT grant for accessing a sidelink channel. In some examples, the DCI transmitting component 1625 may be configured as or otherwise support a means for transmitting second DCI associated with a second search space of the UE, the second DCI including an activation trigger for the LBT grant of the first DCI.

In some examples, transmitting the second DCI triggers activation of the first DCI.

In some examples, the first DCI includes an extended DCI, and the DCI transmitting component 1625 may be configured as or otherwise support a means for transmitting the extended DCI indicating the LBT grant, where the LBT grant indicates a subset of sidelink shared channel transmissions, a subset of sidelink control channel transmissions, or both, based on the LBT procedure.

In some examples, the first DCI includes an extended DCI indicating switching between the first search space of the UE to the second search space of the UE.

In some examples, the UCI configuration component 1630 may be configured as or otherwise support a means for transmitting an indication of an uplink resource for transmitting UCI to report whether the UE received one or more discontinuous transmissions from at least a second UE during a portion of the sidelink channel.

In some examples, the feedback receiving component 1635 may be configured as or otherwise support a means for receiving a negative acknowledgement on the uplink resource as part of the UCI to indicate a contention window update based on the one or more discontinuous transmissions. In some examples, the contention window updating component 1640 may be configured as or otherwise support a means for transmitting an update to the contention window in accordance with the received negative acknowledgement.

Additionally or alternatively, the communications manager 1620 may support wireless communications at network entity operating in an unlicensed band in accordance with examples as disclosed herein. In some examples, the DCI transmitting component 1625 may be configured as or otherwise support a means for transmitting first DCI associated with a first search space of a UE, the first DCI indicating a first LBT grant for accessing a sidelink channel during a first COT. In some examples, the DCI transmitting component 1625 may be configured as or otherwise support a means for transmitting second DCI associated with a second search space of the UE, the second DCI indicating a second LBT grant for accessing an uplink channel during the first COT, the second DCI being coupled with the first DCI.

In some examples, the first DCI indicates that the first COT is shared by the network entity.

Figure 17:
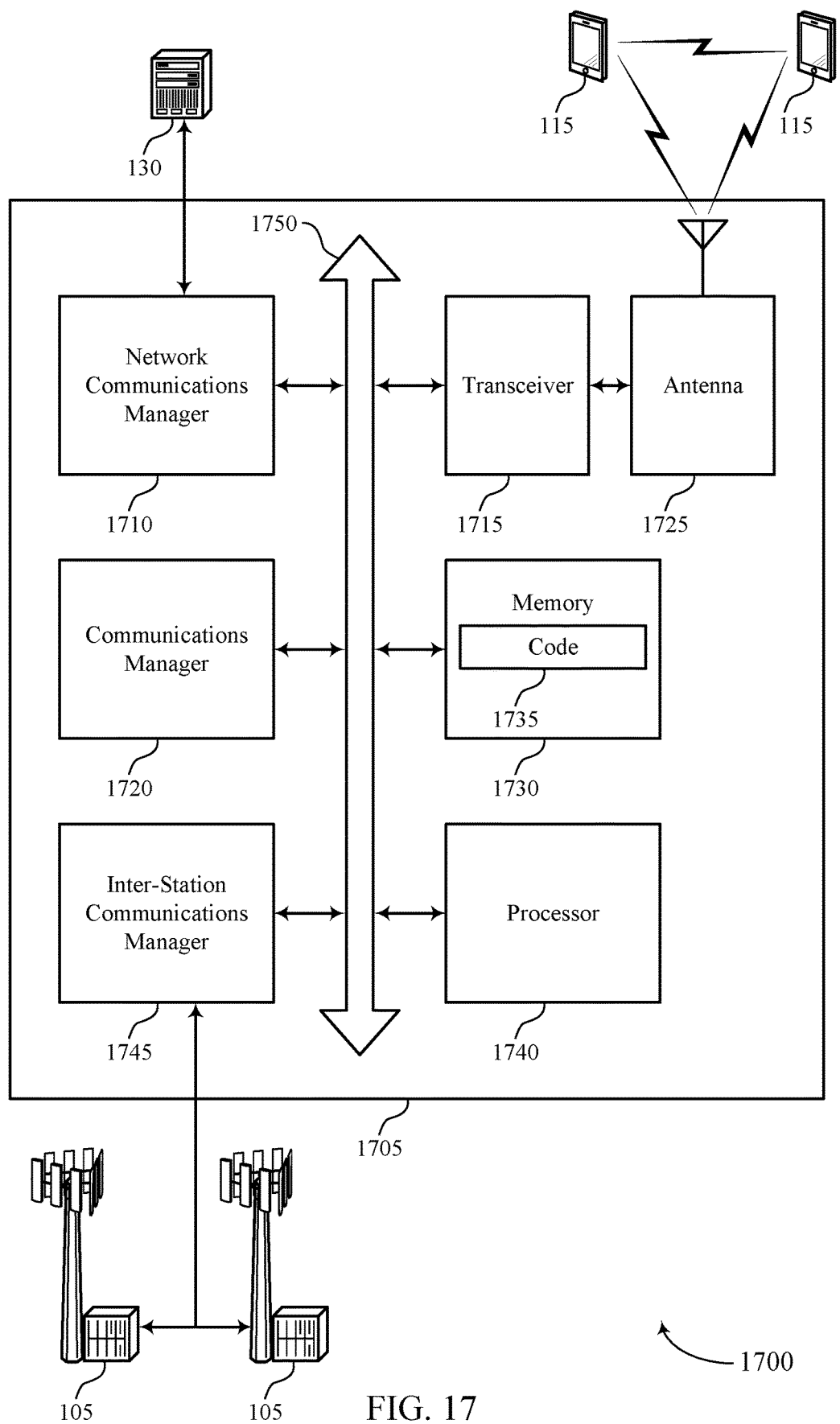
FIG. 17 shows a diagram of a system including a device that supports sidelink mode-1 based standalone operations in accordance with aspects of the present disclosure.

FIG. 17 shows a diagram of a system 1700 including a device 1705 that supports sidelink mode-1 based standalone operations in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting sidelink mode-1 based standalone operations). For example, the device 1705 or a component of the device 1705 may include a processor 1740 and memory 1730 coupled with or to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a network entity operating in an unlicensed band in accordance with examples as disclosed herein. For example, the communications manager 1720 may be configured as or otherwise support a means for transmitting first DCI associated with a first search space of a UE, the first DCI indicating an LBT grant for accessing a sidelink channel. The communications manager 1720 may be configured as or otherwise support a means for transmitting second DCI associated with a second search space of the UE, the second DCI including an activation trigger for the LBT grant of the first DCI.

Additionally or alternatively, the communications manager 1720 may support wireless communications at network entity operating in an unlicensed band in accordance with examples as disclosed herein. For example, the communications manager 1720 may be configured as or otherwise support a means for transmitting first DCI associated with a first search space of a UE, the first DCI indicating a first LBT grant for accessing a sidelink channel during a first COT. The communications manager 1720 may be configured as or otherwise support a means for transmitting second DCI associated with a second search space of the UE, the second DCI indicating a second LBT grant for accessing an uplink channel during the first COT, the second DCI being coupled with the first DCI.

By including or configuring the communications manager 1720 in accordance with examples as described herein, the device 1705 may support techniques for improved communication reliability, reduced power consumption, more efficient utilization of communication resources, improved coordination between devices, longer battery life, reduced LBT uncertainty, and reduced intra-RAT collisions on an unlicensed band.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of sidelink mode-1 based standalone operations as described herein, or the processor 1740 and the memory 1730 may be otherwise configured to perform or support such operations.

Figure 18:
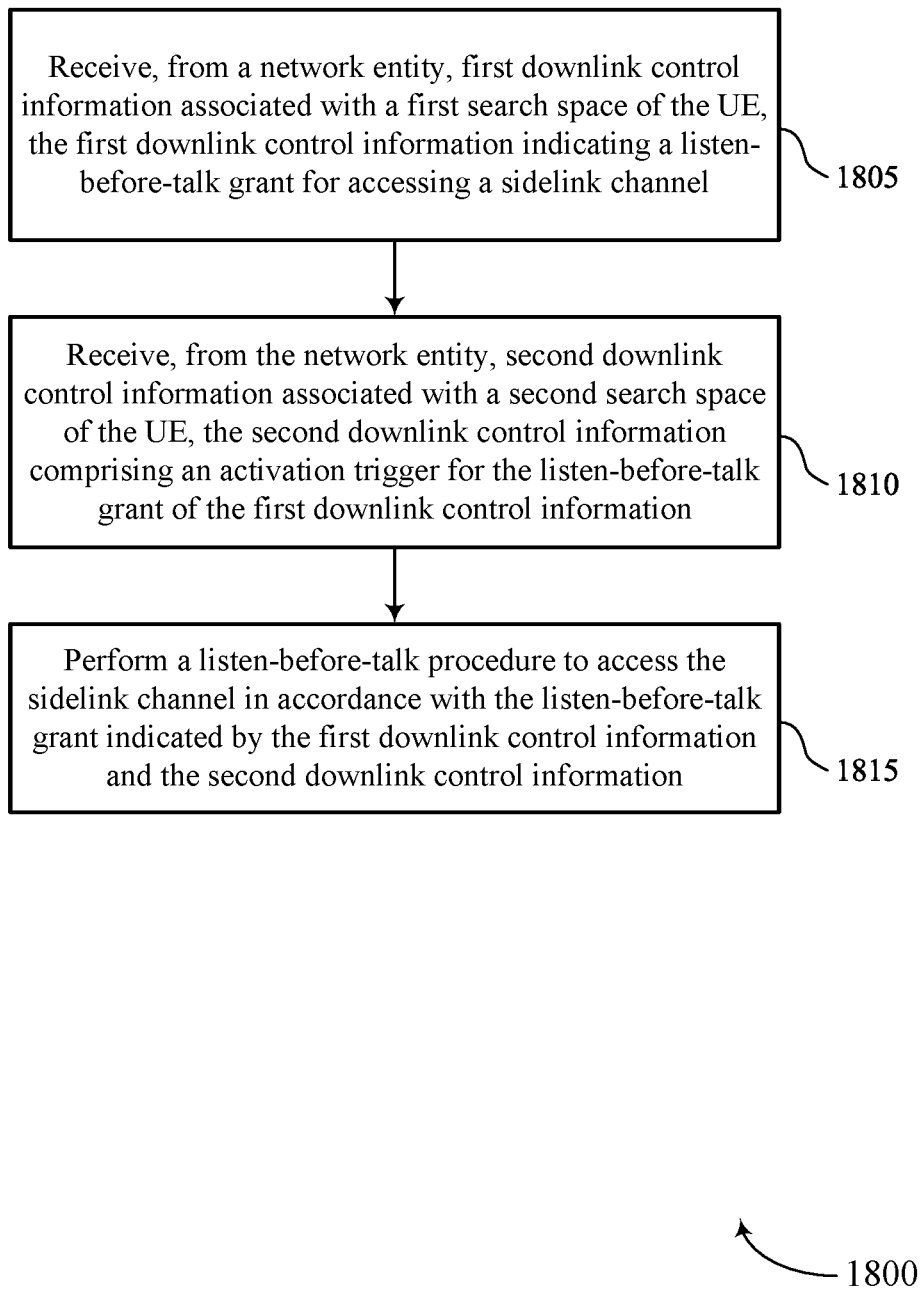
FIGS. 18 through 23 show flowcharts illustrating methods that support sidelink mode-1 based standalone operations in accordance with aspects of the present disclosure.

FIG. 18 shows a flowchart illustrating a method 1800 that supports sidelink mode-1 based standalone operations in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving, from a network entity, first DCI associated with a first search space of the UE, the first DCI indicating an LBT grant for accessing a sidelink channel. The operations of 1805 may be performed in accordance with examples as disclosed herein. In some examples, aspects of the operations of 1805 may be performed by a DCI receiving component 1225 as described with reference to FIG. 12.

At 1810, the method may include receiving, from the network entity, second DCI associated with a second search space of the UE, the second DCI including an activation trigger for the LBT grant of the first DCI. The operations of 1810 may be performed in accordance with examples as disclosed herein. In some examples, aspects of the operations of 1810 may be performed by a DCI receiving component 1225 as described with reference to FIG. 12.

At 1815, the method may include performing an LBT procedure to access the sidelink channel in accordance with the LBT grant indicated by the first DCI and the second DCI. The operations of 1815 may be performed in accordance with examples as disclosed herein. In some examples, aspects of the operations of 1815 may be performed by a sidelink LBT component 1230 as described with reference to FIG. 12.

Figure 19:
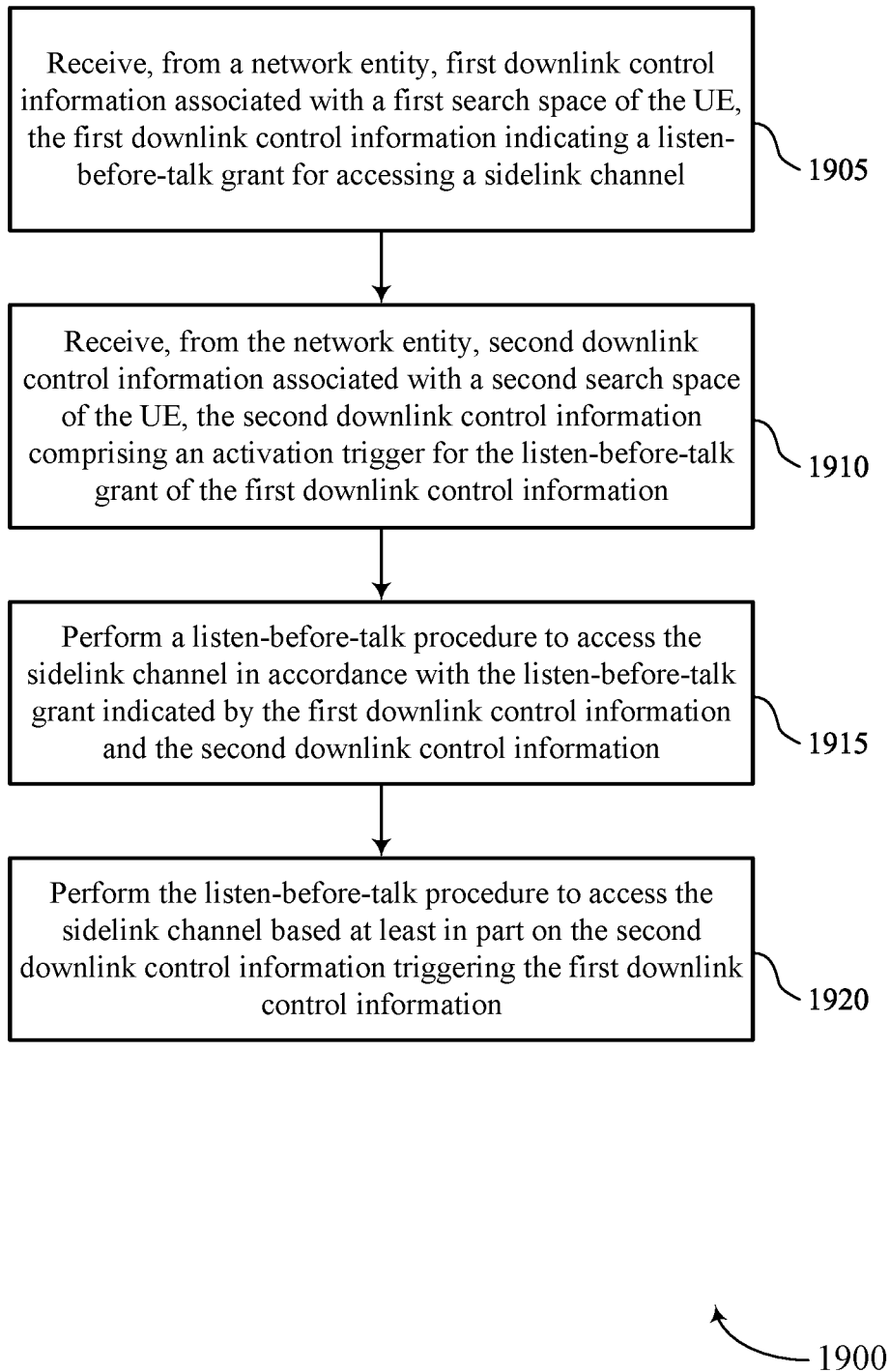

FIG. 19 shows a flowchart illustrating a method 1900 that supports sidelink mode-1 based standalone operations in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a network entity, first DCI associated with a first search space of the UE, the first DCI indicating an LBT grant for accessing a sidelink channel. The operations of 1905 may be performed in accordance with examples as disclosed herein. In some examples, aspects of the operations of 1905 may be performed by a DCI receiving component 1225 as described with reference to FIG. 12.

At 1910, the method may include receiving, from the network entity, second DCI associated with a second search space of the UE, the second DCI including an activation trigger for the LBT grant of the first DCI. The operations of 1910 may be performed in accordance with examples as disclosed herein. In some examples, aspects of the operations of 1910 may be performed by a DCI receiving component 1225 as described with reference to FIG. 12.

At 1915, the method may include performing an LBT procedure to access the sidelink channel in accordance with the LBT grant indicated by the first DCI and the second DCI. The operations of 1915 may be performed in accordance with examples as disclosed herein. In some examples, aspects of the operations of 1915 may be performed by a sidelink LBT component 1230 as described with reference to FIG. 12.

At 1920, the method may include performing the LBT procedure to access the sidelink channel based on the second DCI triggering the first DCI. The operations of 1920 may be performed in accordance with examples as disclosed herein. In some examples, aspects of the operations of 1920 may be performed by a sidelink LBT component 1230 as described with reference to FIG. 12.

Figure 20:
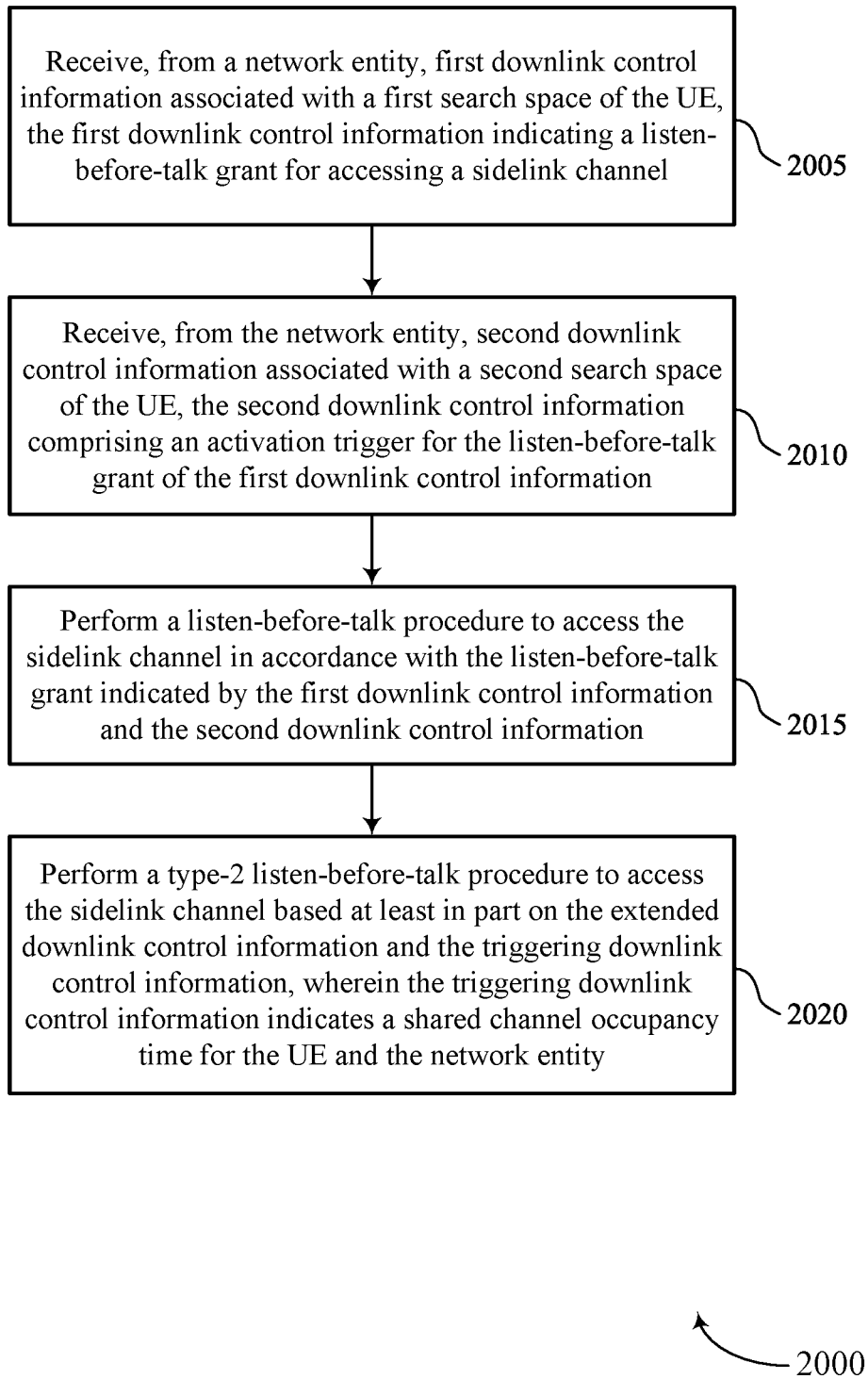

FIG. 20 shows a flowchart illustrating a method 2000 that supports sidelink mode-1 based standalone operations in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a network entity, first DCI associated with a first search space of the UE, the first DCI indicating an LBT grant for accessing a sidelink channel. The operations of 2005 may be performed in accordance with examples as disclosed herein. In some examples, aspects of the operations of 2005 may be performed by a DCI receiving component 1225 as described with reference to FIG. 12.

At 2010, the method may include receiving, from the network entity, second DCI associated with a second search space of the UE, the second DCI including an activation trigger for the LBT grant of the first DCI. The operations of 2010 may be performed in accordance with examples as disclosed herein. In some examples, aspects of the operations of 2010 may be performed by a DCI receiving component 1225 as described with reference to FIG. 12.

At 2015, the method may include performing an LBT procedure to access the sidelink channel in accordance with the LBT grant indicated by the first DCI and the second DCI. The operations of 2015 may be performed in accordance with examples as disclosed herein. In some examples, aspects of the operations of 2015 may be performed by a sidelink LBT component 1230 as described with reference to FIG. 12.

At 2020, the method may include performing a type-2 LBT procedure to access the sidelink channel based on the extended DCI and the triggering DCI, where the triggering DCI indicates a shared COT for the UE and the network entity. The operations of 2020 may be performed in accordance with examples as disclosed herein. In some examples, aspects of the operations of 2020 may be performed by a sidelink LBT component 1230 as described with reference to FIG. 12.

Figure 21:
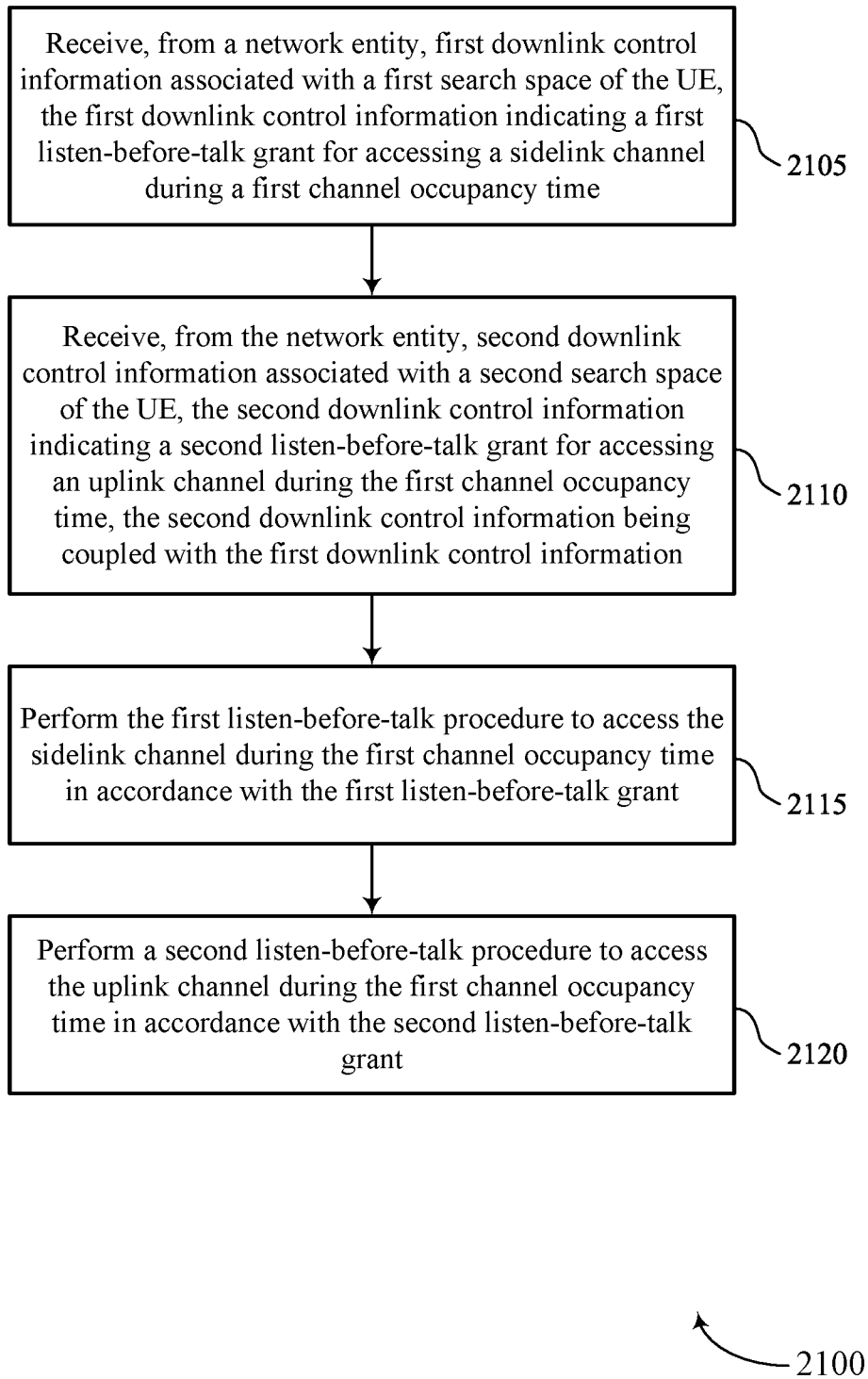

FIG. 21 shows a flowchart illustrating a method 2100 that supports sidelink mode-1 based standalone operations in accordance with aspects of the present disclosure. The operations of the method 2100 may be implemented by a UE or its components as described herein. For example, the operations of the method 2100 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2105, the method may include receiving, from a network entity, first DCI associated with a first search space of the UE, the first DCI indicating a first LBT grant for accessing a sidelink channel during a first COT. The operations of 2105 may be performed in accordance with examples as disclosed herein. In some examples, aspects of the operations of 2105 may be performed by a DCI receiving component 1225 as described with reference to FIG. 12.

At 2110, the method may include receiving, from the network entity, second DCI associated with a second search space of the UE, the second DCI indicating a second LBT grant for accessing an uplink channel during the first COT, the second DCI being coupled with the first DCI. The operations of 2110 may be performed in accordance with examples as disclosed herein. In some examples, aspects of the operations of 2110 may be performed by a DCI receiving component 1225 as described with reference to FIG. 12.

At 2115, the method may include performing the first LBT procedure to access the sidelink channel during the first COT in accordance with the first LBT grant. The operations of 2115 may be performed in accordance with examples as disclosed herein. In some examples, aspects of the operations of 2115 may be performed by a sidelink LBT component 1230 as described with reference to FIG. 12.

At 2120, the method may include performing a second LBT procedure to access the uplink channel during the first COT in accordance with the second LBT grant. The operations of 2120 may be performed in accordance with examples as disclosed herein. In some examples, aspects of the operations of 2120 may be performed by an uplink LBT component 1235 as described with reference to FIG. 12.

Figure 22:
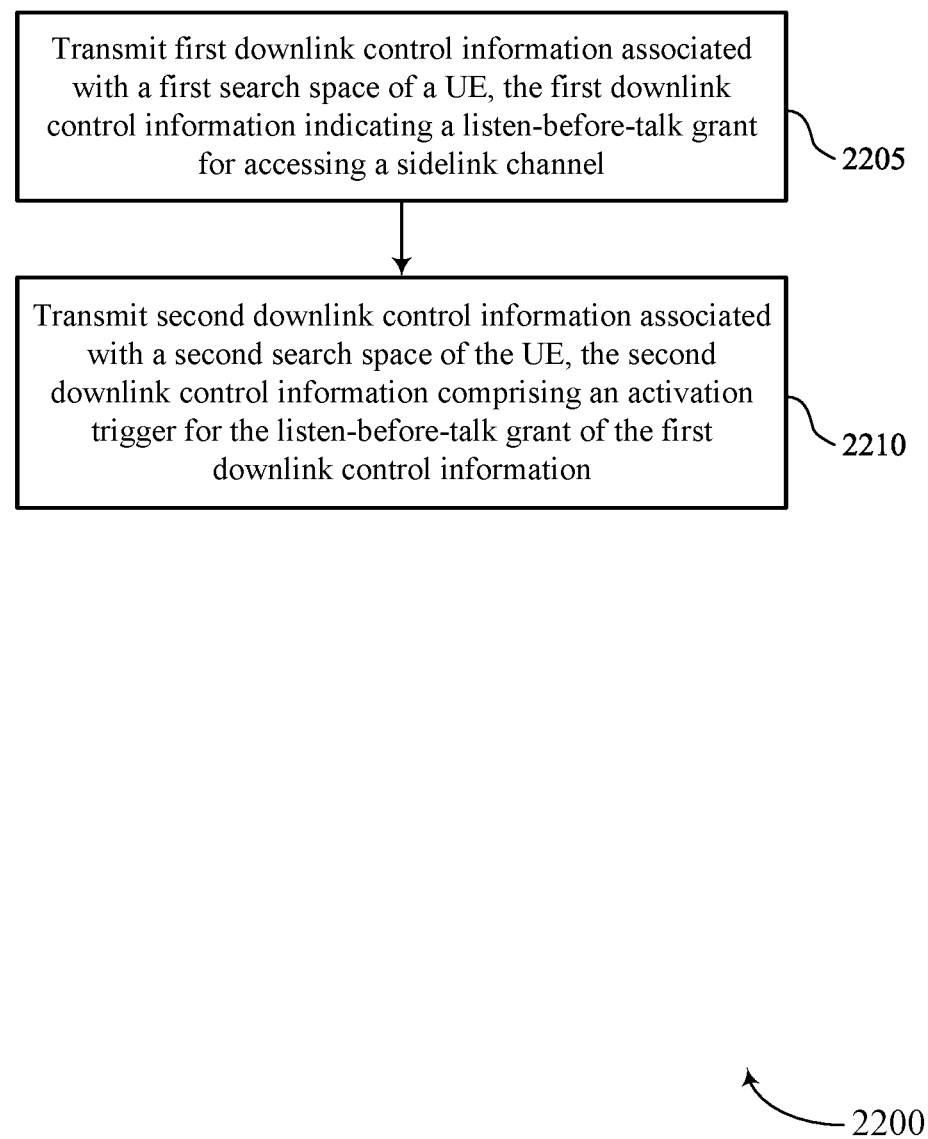

FIG. 22 shows a flowchart illustrating a method 2200 that supports sidelink mode-1 based standalone operations in accordance with aspects of the present disclosure. The operations of the method 2200 may be implemented by a network entity or its components as described herein. For example, the operations of the method 2200 may be performed by a base station 105 as described with reference to FIGS. 1 through 9 and 14 through 17. In some examples, a network entity may execute a set of instructions to control the functional elements of the network entity to perform the described functions. Additionally or alternatively, the network entity may perform aspects of the described functions using special-purpose hardware.

At 2205, the method may include transmitting first DCI associated with a first search space of a UE, the first DCI indicating an LBT grant for accessing a sidelink channel. The operations of 2205 may be performed in accordance with examples as disclosed herein. In some examples, aspects of the operations of 2205 may be performed by a DCI transmitting component 1625 as described with reference to FIG. 16.

At 2210, the method may include transmitting second DCI associated with a second search space of the UE, the second DCI including an activation trigger for the LBT grant of the first DCI. The operations of 2210 may be performed in accordance with examples as disclosed herein. In some examples, aspects of the operations of 2210 may be performed by a DCI transmitting component 1625 as described with reference to FIG. 16.

Figure 23:
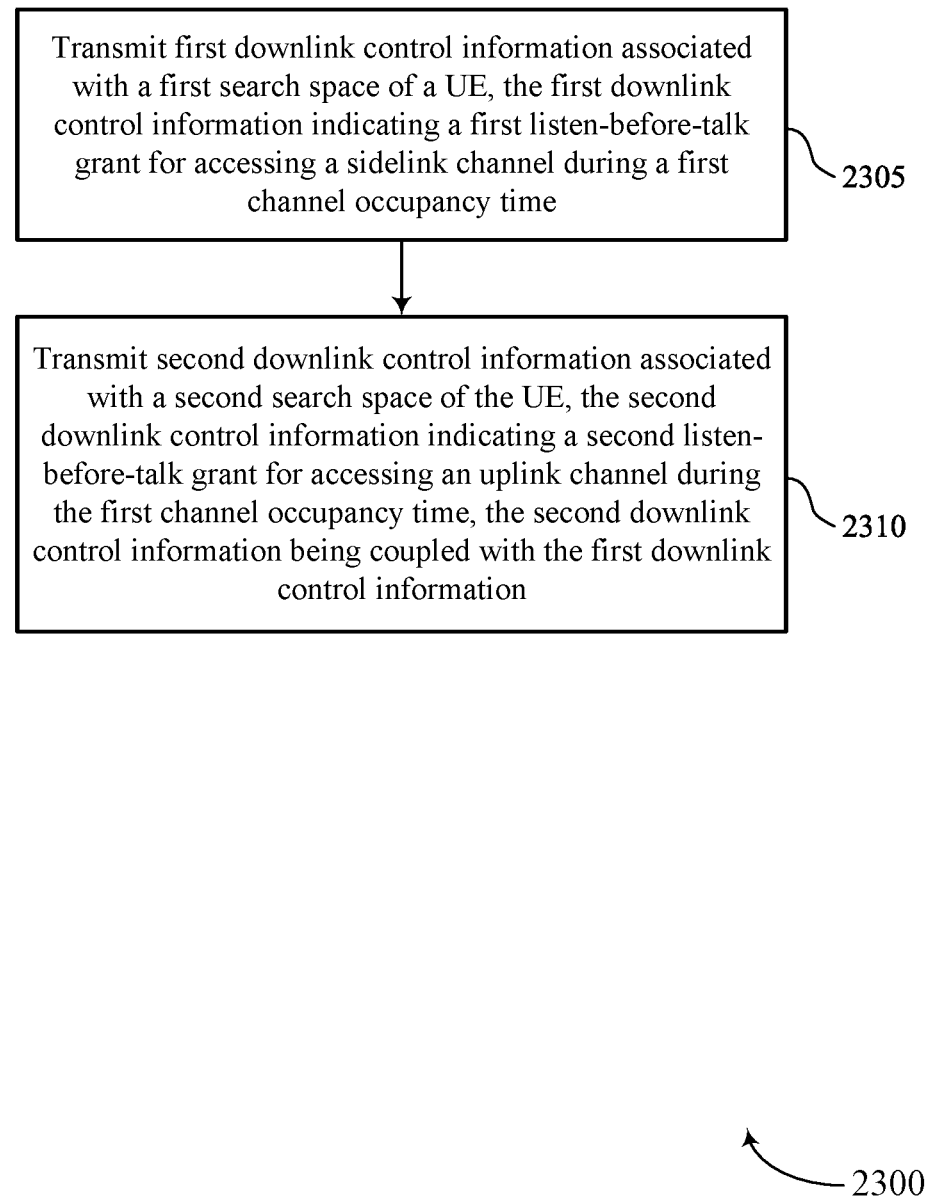

FIG. 23 shows a flowchart illustrating a method 2300 that supports sidelink mode-1 based standalone operations in accordance with aspects of the present disclosure. The operations of the method 2300 may be implemented by a network entity or its components as described herein. For example, the operations of the method 2300 may be performed by a base station 105 as described with reference to FIGS. 1 through 9 and 14 through 17. In some examples, a network entity may execute a set of instructions to control the functional elements of the network entity to perform the described functions. Additionally or alternatively, the network entity may perform aspects of the described functions using special-purpose hardware.

At 2305, the method may include transmitting first DCI associated with a first search space of a UE, the first DCI indicating a first LBT grant for accessing a sidelink channel during a first COT. The operations of 2305 may be performed in accordance with examples as disclosed herein. In some examples, aspects of the operations of 2305 may be performed by a DCI transmitting component 1625 as described with reference to FIG. 16.

At 2310, the method may include transmitting second DCI associated with a second search space of the UE, the second DCI indicating a second LBT grant for accessing an uplink channel during the first COT, the second DCI being coupled with the first DCI. The operations of 2310 may be performed in accordance with examples as disclosed herein. In some examples, aspects of the operations of 2310 may be performed by a DCI transmitting component 1625 as described with reference to FIG. 16.

The following provides an overview of aspects of the present disclosure:

Aspect 1: A method for wireless communication at a UE operating in an unlicensed band, comprising: receiving, from a network entity, first DCI associated with a first search space of the UE, the first DCI indicating a LBT grant for accessing a sidelink channel; receiving, from the network entity, second DCI associated with a second search space of the UE, the second DCI comprising an activation trigger for the LBT grant of the first DCI; and performing a LBT procedure to access the sidelink channel in accordance with the LBT grant indicated by the first DCI and the second DCI.

Aspect 2: The method of aspect 1, further comprising: performing the LBT procedure to access the sidelink channel based at least in part on the second DCI triggering the first DCI.

Aspect 3: The method of any of aspects 1 through 2, wherein the first DCI comprises an extended DCI, the method further comprising: receiving, from the network entity, the extended DCI indicating the LBT grant, wherein the LBT grant indicates a subset of sidelink shared channel transmissions, a subset of sidelink control channel transmissions, or both, based at least in part on the LBT procedure.

Aspect 4: The method of aspect 3, further comprising: determining, based at least in part on the extended DCI, a set of sidelink feedback channel resources for transmitting HARQ information corresponding to the subset of sidelink shared channel transmissions, the subset of sidelink control channel transmissions, or both; and transmitting an indication of the set of sidelink feedback channel resources to at least a second UE.

Aspect 5: The method of any of aspects 1 through 4, wherein the first DCI comprises an extended DCI indicating an LBT type for the LBT procedure, the method further comprising: performing a type-1 LBT procedure to access the sidelink channel based at least in part on the extended DCI.

Aspect 6: The method of any of aspects 1 through 5, wherein the first DCI comprises an extended DCI indicating an LBT type for the LBT procedure and the second DCI comprises a triggering DCI, the method further comprising: performing a type-2 LBT procedure to access the sidelink channel based at least in part on the extended DCI and the triggering DCI, wherein the triggering DCI indicates a shared COT for the UE and the network entity.

Aspect 7: The method of aspect 6, wherein the triggering DCI further indicates a corresponding set of sidelink feedback resources associated with the type-2 LBT.

Aspect 8: The method of any of aspects 6 through 7, wherein the triggering DCI comprises a first DCI format to trigger the extended DCI or a second DCI format having a triggering field.

Aspect 9: The method of any of aspects 1 through 8, wherein the first DCI comprises an extended DCI indicating switching between the first search space of the UE to the second search space of the UE.

Aspect 10: The method of aspect 9, wherein the extended DCI comprises a one-bit trigger for the UE to switch between monitoring the first search space of the UE to the second search space of the UE.

Aspect 11: The method of any of aspects 9 through 10, wherein the extended DCI comprises a plurality of bits indicating a monitoring offset and a trigger for the UE to switch between monitoring the first search space of the UE to the second search space of the UE.

Aspect 12: The method of any of aspects 1 through 11, further comprising: receiving, from the network entity, an indication of an uplink resource for transmitting uplink control information to report whether the UE received one or more discontinuous transmissions from at least a second UE during a portion of the sidelink channel.

Aspect 13: The method of aspect 12, further comprising: transmitting, to the network entity, a NACK on the uplink resource as part of the uplink control information to indicate a contention window update based at least in part on the one or more discontinuous transmissions.

Aspect 14: The method of any of aspects 1 through 13, wherein the first search space and the second search space comprise slot-based search space sets, mini-slot-based search space sets, or a combination thereof.

Aspect 15: The method of any of aspects 1 through 14, wherein the LBT procedure comprises a type-2 LBT procedure.

Aspect 16: A method for wireless communications at a UE operating in an unlicensed band, comprising: receiving, from a network entity, first DCI associated with a first search space of the UE, the first DCI indicating a first LBT grant for accessing a sidelink channel during a first COT; receiving, from the network entity, second DCI associated with a second search space of the UE, the second DCI indicating a second LBT grant for accessing an uplink channel during the first COT, the second DCI being coupled with the first DCI; performing the first LBT procedure to access the sidelink channel during the first COT in accordance with the first LBT grant; and performing a second LBT procedure to access the uplink channel during the first COT in accordance with the second LBT grant.

Aspect 17: The method of aspect 16, wherein the first LBT comprises a type-1 LBT and the second LBT comprises a type-2 LBT.

Aspect 18: The method of any of aspects 16 through 17, further comprising: transmitting a first sidelink transmission during the first COT using a first transmission power; and transmitting a first uplink transmission during the first COT using a second transmission power, the second transmission power being less than or equal to the first transmission power.

Aspect 19: The method of any of aspects 16 through 18, wherein the first DCI indicates that the first COT is shared by the network entity.

Aspect 20: The method of any of aspects 16 through 19, further comprising: receiving, from the network entity, a first configured grant for transmitting sidelink communications during the first COT; and coupling the first configured grant with a corresponding configured grant for uplink or a dynamic grant for uplink during the first COT.

Aspect 21: The method of any of aspects 16 through 20, further comprising: receiving, from the network entity, a second configured grant for transmitting uplink communications during the first COT; and coupling the second configured grant with a corresponding configured grant for sidelink or a dynamic grant for sidelink during the first COT.

Aspect 22: The method of any of aspects 16 through 21, further comprising: receiving, from the network entity, third DCI indicating a coupling of a configured grant for uplink or sidelink communications to a dynamic grant for uplink or sidelink communications during the first COT.

Aspect 23: A method for wireless communication at a network entity operating in an unlicensed band, comprising: transmitting first DCI associated with a first search space of a UE, the first DCI indicating a LBT grant for accessing a sidelink channel; and transmitting second DCI associated with a second search space of the UE, the second DCI comprising an activation trigger for the LBT grant of the first DCI.

Aspect 24: The method of aspect 23, wherein transmitting the second DCI triggers activation of the first DCI.

Aspect 25: The method of any of aspects 23 through 24, wherein the first DCI comprises an extended DCI, the method further comprising: transmitting the extended DCI indicating the LBT grant, wherein the LBT grant indicates a subset of sidelink shared channel transmissions, a subset of sidelink control channel transmissions, or both, based at least in part on the LBT procedure.

Aspect 26: The method of any of aspects 23 through 25, wherein the first DCI comprises an extended DCI indicating switching between the first search space of the UE to the second search space of the UE.

Aspect 27: The method of any of aspects 23 through 26, further comprising: transmitting an indication of an uplink resource for transmitting uplink control information to report whether the UE received one or more discontinuous transmissions from at least a second UE during a portion of the sidelink channel.

Aspect 28: The method of any of aspects 23 through 27, further comprising: receiving a NACK on the uplink resource as part of the uplink control information to indicate a contention window update based at least in part on the one or more discontinuous transmissions; transmitting an update to the contention window in accordance with the received NACK.

Aspect 29: A method for wireless communications at network entity operating in an unlicensed band, comprising: transmitting first DCI associated with a first search space of a UE, the first DCI indicating a first LBT grant for accessing a sidelink channel during a first COT; and transmitting second DCI associated with a second search space of the UE, the second DCI indicating a second LBT grant for accessing an uplink channel during the first COT, the second DCI being coupled with the first DCI.

Aspect 30: The method of aspect 29, wherein the first DCI indicates that the first COT is shared by the network entity.

Aspect 31: An apparatus for wireless communication at a UE operating in an unlicensed band, comprising a processor; memory coupled with the processor; and instructions stored in the memory and executable by the processor to cause the apparatus to perform a method of any of aspects 1 through 15.

Aspect 32: An apparatus for wireless communication at a UE operating in an unlicensed band, comprising at least one means for performing a method of any of aspects 1 through 15.

Aspect 33: A non-transitory computer-readable medium storing code for wireless communication at a UE operating in an unlicensed band, the code comprising instructions executable by a processor to perform a method of any of aspects 1 through 15.

Aspect 34: An apparatus for wireless communications at a UE operating in an unlicensed band, comprising a processor; memory coupled with the processor; and instructions stored in the memory and executable by the processor to cause the apparatus to perform a method of any of aspects 16 through 22.

Aspect 35: An apparatus for wireless communications at a UE operating in an unlicensed band, comprising at least one means for performing a method of any of aspects 16 through 22.

Aspect 36: A non-transitory computer-readable medium storing code for wireless communications at a UE operating in an unlicensed band, the code comprising instructions executable by a processor to perform a method of any of aspects 16 through 22.

Aspect 37: An apparatus for wireless communication at a network entity operating in an unlicensed band, comprising a processor; memory coupled with the processor; and instructions stored in the memory and executable by the processor to cause the apparatus to perform a method of any of aspects 23 through 28.

Aspect 38: An apparatus for wireless communication at a network entity operating in an unlicensed band, comprising at least one means for performing a method of any of aspects 23 through 28.

Aspect 39: A non-transitory computer-readable medium storing code for wireless communication at a network entity operating in an unlicensed band, the code comprising instructions executable by a processor to perform a method of any of aspects 23 through 28.

Aspect 40: An apparatus for wireless communications at network entity operating in an unlicensed band, comprising a processor; memory coupled with the processor; and instructions stored in the memory and executable by the processor to cause the apparatus to perform a method of any of aspects 29 through 30.

Aspect 41: An apparatus for wireless communications at network entity operating in an unlicensed band, comprising at least one means for performing a method of any of aspects 29 through 30.

Aspect 42: A non-transitory computer-readable medium storing code for wireless communications at network entity operating in an unlicensed band, the code comprising instructions executable by a processor to perform a method of any of aspects 29 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE) operating in an unlicensed band, comprising:
   receiving, from a network entity, first downlink control information associated with a first search space of the UE, the first downlink control information indicating a listen-before-talk grant for accessing a sidelink channel;
   receiving, from the network entity, second downlink control information associated with a second search space of the UE, the second downlink control information comprising an activation trigger for the listen-before-talk grant of the first downlink control information; and
   performing a listen-before-talk procedure to access the sidelink channel in accordance with the listen-before-talk grant indicated by the first downlink control information and the second downlink control information.

2. The method of claim 1, further comprising:
   performing the listen-before-talk procedure to access the sidelink channel based at least in part on the second downlink control information triggering the first downlink control information.

3. The method of claim 1, wherein the first downlink control information comprises an extended downlink control information, the method further comprising:
   receiving, from the network entity, the extended downlink control information indicating the listen-before-talk grant, wherein the listen-before-talk grant indicates a subset of sidelink shared channel transmissions, a subset of sidelink control channel transmissions, or both, based at least in part on the listen-before-talk procedure.

4. The method of claim 3, further comprising:
   determining, based at least in part on the extended downlink control information, a set of sidelink feedback channel resources for transmitting hybrid automatic repeat request (HARQ) information corresponding to the subset of sidelink shared channel transmissions, the subset of sidelink control channel transmissions, or both; and
   transmitting an indication of the set of sidelink feedback channel resources to at least a second UE.

5. The method of claim 1, wherein the first downlink control information comprises an extended downlink control information indicating an listen-before-talk type for the listen-before-talk procedure, the method further comprising:
   performing a type-1 listen-before-talk procedure to access the sidelink channel based at least in part on the extended downlink control information.

6. The method of claim 1, wherein the first downlink control information comprises an extended downlink control information indicating an listen-before-talk type for the listen-before-talk procedure and the second downlink control information comprises a triggering downlink control information, the method further comprising:
   performing a type-2 listen-before-talk procedure to access the sidelink channel based at least in part on the extended downlink control information and the triggering downlink control information, wherein the triggering downlink control information indicates a shared channel occupancy time for the UE and the network entity.

7. The method of claim 6, wherein the triggering downlink control information further indicates a corresponding set of sidelink feedback resources associated with the type-2 listen-before-talk.

8. The method of claim 6, wherein the triggering downlink control information comprises a first downlink control information format to trigger the extended downlink control information or a second downlink control information format having a triggering field.

9. The method of claim 1, wherein the first downlink control information comprises an extended downlink control information indicating switching between the first search space of the UE to the second search space of the UE.

10. The method of claim 9, wherein the extended downlink control information comprises a one-bit trigger for the UE to switch between monitoring the first search space of the UE to the second search space of the UE.

11. The method of claim 9, wherein the extended downlink control information comprises a plurality of bits indicating a monitoring offset and a trigger for the UE to switch between monitoring the first search space of the UE to the second search space of the UE.

12. The method of claim 1, further comprising:
receiving, from the network entity, an indication of an uplink resource for transmitting uplink control information to report whether the UE received one or more discontinuous transmissions from at least a second UE during a portion of the sidelink channel.

13. The method of claim 12, further comprising:
transmitting, to the network entity, a negative acknowledgement on the uplink resource as part of the uplink control information to indicate a contention window update based at least in part on the one or more discontinuous transmissions.

14. The method of claim 1, wherein the first search space and the second search space comprise slot-based search space sets, mini-slot-based search space sets, or a combination thereof.

15. The method of claim 1, wherein the listen-before-talk procedure comprises a type-2 listen-before-talk procedure.

16. A method for wireless communications at a user equipment (UE) operating in an unlicensed band, comprising:
receiving, from a network entity, first downlink control information associated with a first search space of the UE, the first downlink control information indicating a first listen-before-talk grant for accessing a sidelink channel during a first channel occupancy time;
receiving, from the network entity, second downlink control information associated with a second search space of the UE, the second downlink control information indicating a second listen-before-talk grant for accessing an uplink channel during the first channel occupancy time, the second downlink control information being coupled with the first downlink control information;
performing a first listen-before-talk procedure to access the sidelink channel during the first channel occupancy time in accordance with the first listen-before-talk grant; and
performing a second listen-before-talk procedure to access the uplink channel during the first channel occupancy time in accordance with the second listen-before-talk grant.

17. The method of claim 16, wherein the first listen-before-talk comprises a type-1 listen-before-talk and the second listen-before-talk comprises a type-2 listen-before-talk.

18. The method of claim 16, further comprising:
transmitting a first sidelink transmission during the first channel occupancy time using a first transmission power; and
transmitting a first uplink transmission during the first channel occupancy time using a second transmission power, the second transmission power being less than or equal to the first transmission power.

19. The method of claim 16, wherein the first downlink control information indicates that the first channel occupancy time is shared by the network entity.

20. The method of claim 16, further comprising:
receiving, from the network entity, a first configured grant for transmitting sidelink communications during the first channel occupancy time; and
coupling the first configured grant with a corresponding configured grant for uplink or a dynamic grant for uplink during the first channel occupancy time.

21. The method of claim 16, further comprising:
receiving, from the network entity, a second configured grant for transmitting uplink communications during the first channel occupancy time; and
coupling the second configured grant with a corresponding configured grant for sidelink or a dynamic grant for sidelink during the first channel occupancy time.

22. The method of claim 16, further comprising:
receiving, from the network entity, third downlink control information indicating a coupling of a configured grant for uplink or sidelink communications to a dynamic grant for uplink or sidelink communications during the first channel occupancy time.

23. A method for wireless communication at a network entity operating in an unlicensed band, comprising:
transmitting first downlink control information associated with a first search space of a user equipment (UE), the first downlink control information indicating a listen-before-talk grant for accessing a sidelink channel; and
transmitting second downlink control information associated with a second search space of the UE, the second downlink control information comprising an activation trigger for the listen-before-talk grant of the first downlink control information.

24. The method of claim 23, wherein transmitting the second downlink control information triggers activation of the first downlink control information.

25. The method of claim 23, wherein the first downlink control information comprises an extended downlink control information, the method further comprising:
transmitting the extended downlink control information indicating the listen-before-talk grant, wherein the listen-before-talk grant indicates a subset of sidelink shared channel transmissions, a subset of sidelink control channel transmissions, or both.

26. The method of claim 23, wherein the first downlink control information comprises an extended downlink control information indicating switching between the first search space of the UE to the second search space of the UE.

27. The method of claim 23, further comprising:
transmitting an indication of an uplink resource for transmitting uplink control information to report whether the UE received one or more discontinuous transmissions from at least a second UE during a portion of the sidelink channel.

28. The method of claim 27, further comprising:
receiving a negative acknowledgement on an uplink resource as part of uplink control information to indicate a contention window update based at least in part on the one or more discontinuous transmissions;
transmitting an update to the contention window in accordance with the received negative acknowledgement.

29. A method for wireless communications at a network entity operating in an unlicensed band, comprising:
transmitting first downlink control information associated with a first search space of a user equipment (UE), the first downlink control information indicating a first listen-before-talk grant for accessing a sidelink channel during a first channel occupancy time; and transmitting second downlink control information associated with a second search space of the UE, the second downlink control information indicating a second listen-before-talk grant for accessing an uplink channel during the first channel occupancy time, the second downlink control information being coupled with the first downlink control information.

30. The method of claim 29, wherein the first downlink control information indicates that the first channel occupancy time is shared by the network entity.

* * * * *